(12) United States Patent
Garbos

(10) Patent No.: US 8,490,327 B2
(45) Date of Patent: Jul. 23, 2013

(54) INTEGRATED MOVING AND ANCHORING SYSTEM FOR MOVABLE AGRICULTURE STRUCTURES

(76) Inventor: Gregory Ryan Garbos, Kansas City, MO (US)

( * ) Notice: Subject to any disclaimer, the term of this patent is extended or adjusted under 35 U.S.C. 154(b) by 0 days.

(21) Appl. No.: 13/295,031

(22) Filed: Nov. 11, 2011

(65) Prior Publication Data

US 2012/0117866 A1 May 17, 2012

Related U.S. Application Data

(60) Provisional application No. 61/412,748, filed on Nov. 11, 2010.

(51) Int. Cl.
*A01G 9/16* (2006.01)
(52) U.S. Cl.
USPC ............... 47/17; 47/29.5; 47/32.3; 47/58.1 R
(58) Field of Classification Search
USPC .................. 47/17, 18, 19.1, 20.1, 22.1, 29.5, 47/32.3, 58.1 R, 29.6
See application file for complete search history.

(56) References Cited

U.S. PATENT DOCUMENTS

| | | | | |
|---|---|---|---|---|
| 3,812,616 | A * | 5/1974 | Koziol | 52/63 |
| 5,101,593 | A * | 4/1992 | Bhatt | 47/17 |
| 5,605,007 | A * | 2/1997 | Hinsperger | 47/17 |
| 7,263,805 | B2 * | 9/2007 | Chapus | 52/67 |
| 2006/0162247 | A1 * | 7/2006 | Corbett | 47/29.1 |

OTHER PUBLICATIONS

Chest of Books, "Greenhouses on Rails," available at http://chestofbooks.com/gardening-horticulture/Commercial-Gardening-1/Greenhouses-On-Rails.html. Oct. 29, 2009.*
RIMOL Greenhouse Systems, Inc., "The Organic Greenhouse," available at http://www.rimolgreenhouses.com/product_info.php?cPath=22&products_id=734. May 1, 2009.*
Hightunnels.org, "Mobile High Tunnels," available at http://www.hightunnels.org/ForGrowers/GrowersUsing/Rimol%20Rolling%20Thunder.html. Sep. 18, 2010.*
Chelsea Green, "The Advantages of Mobile Greenhouses," available at http://www.chelseagreen.com/content/the-advantages-of-the-mobile-greenhouse/. Apr. 20, 2009.*

* cited by examiner

*Primary Examiner* — Rob Swiatek
*Assistant Examiner* — Lisa Tsang
(74) *Attorney, Agent, or Firm* — Oliff & Berridge, PLC; R. Brian Drozd

(57) ABSTRACT

A movable greenhouse and track system may include a track configured to be anchored to a first plot of farming land and a second plot of farming land. The movable greenhouse and track system may further include a greenhouse is capable of being anchored to the track and an anchoring member. The greenhouse may include a series of hoops forming an interior area; a member attached to the hoops for keeping the interior area of the greenhouse a certain temperature different than a temperature from an area exterior to the greenhouse; and a member for facilitating movement of the greenhouse along the tunnel of the track. The interior area of the greenhouse may include the first plot of farming land. After a predetermined time, the member for facilitating movement allows the greenhouse to be moved from the first plot of farming land to the second plot of farming land.

6 Claims, 31 Drawing Sheets

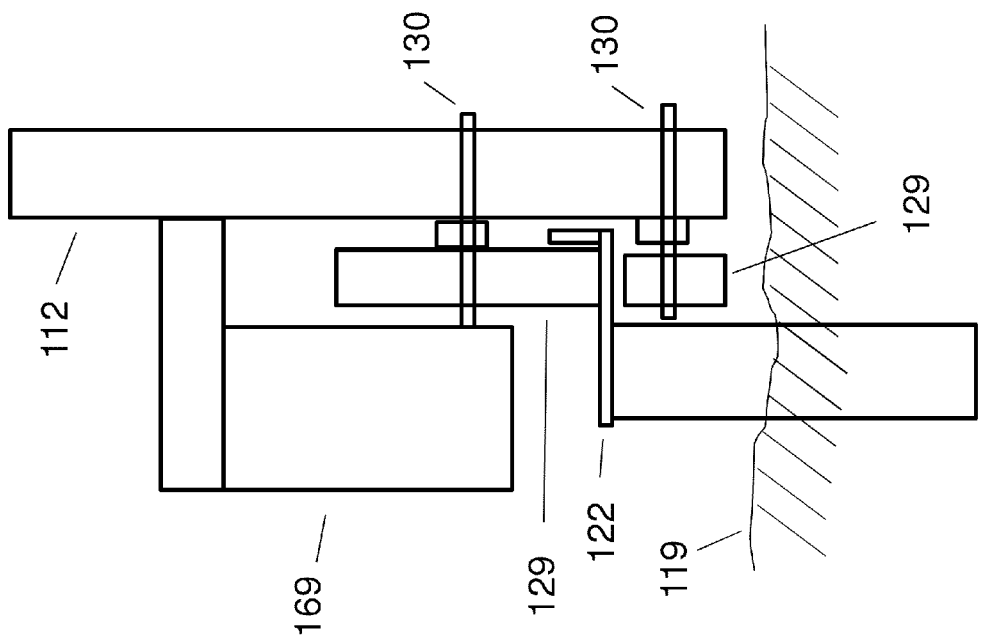
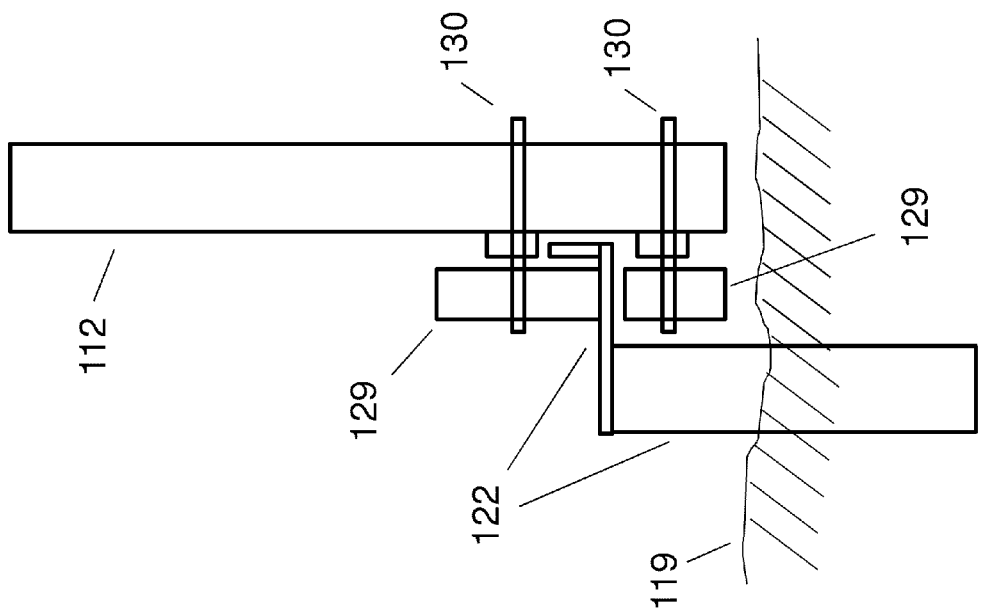

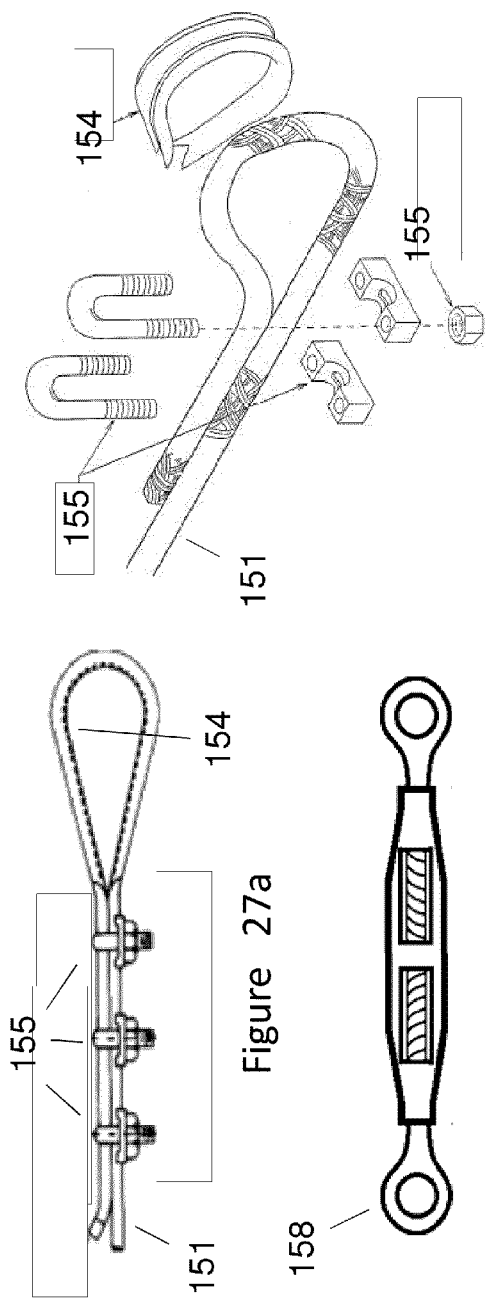
Figure 27f
Figure 27a
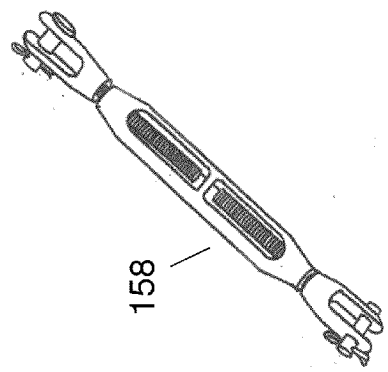
Figure 27g
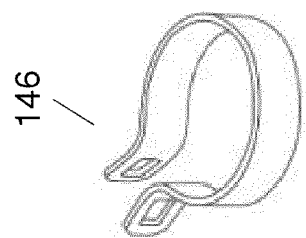
Figure 27e
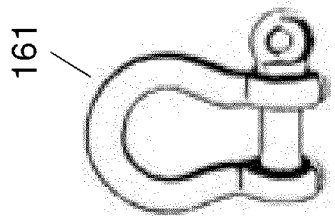
Figure 27d
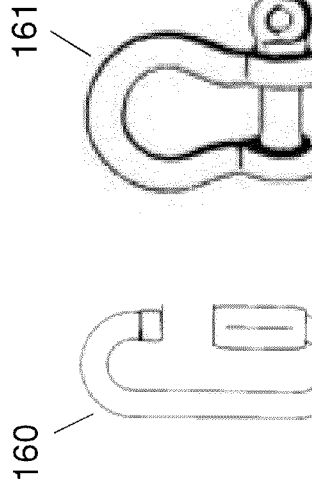
Figure 27b
Figure 27c

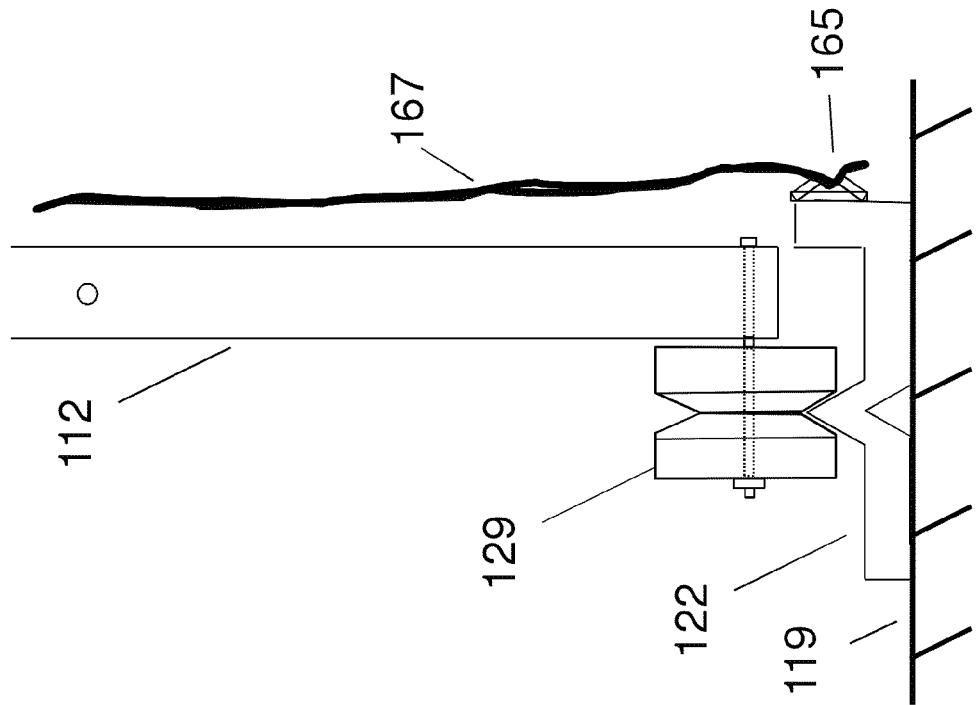
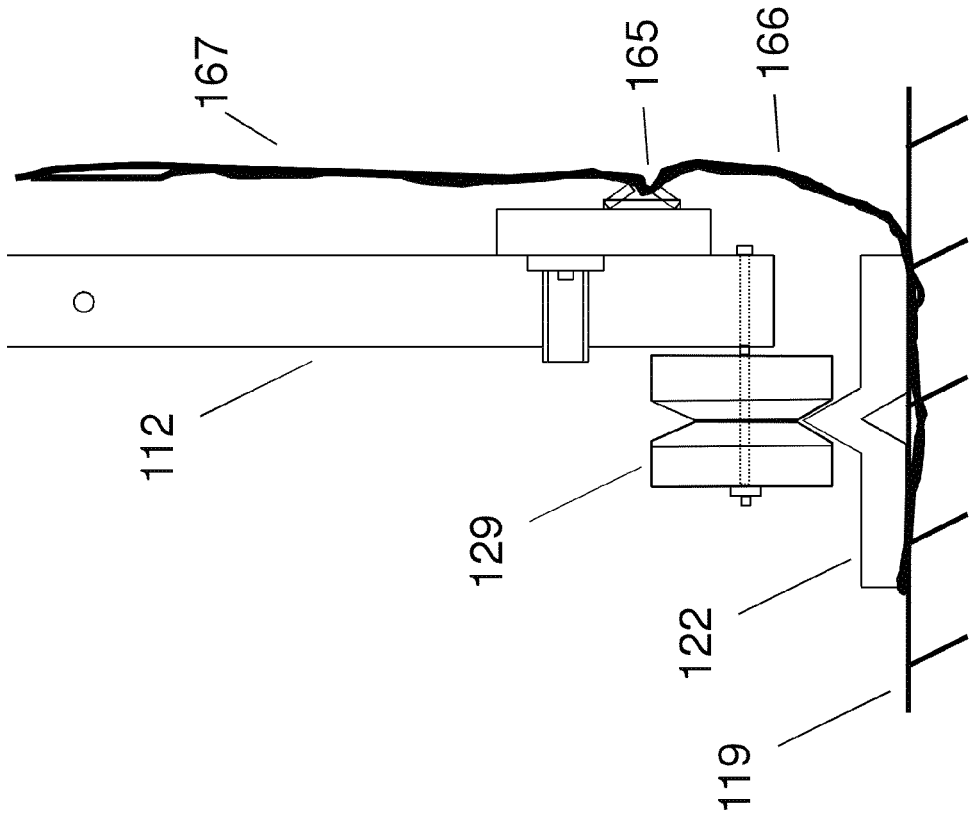

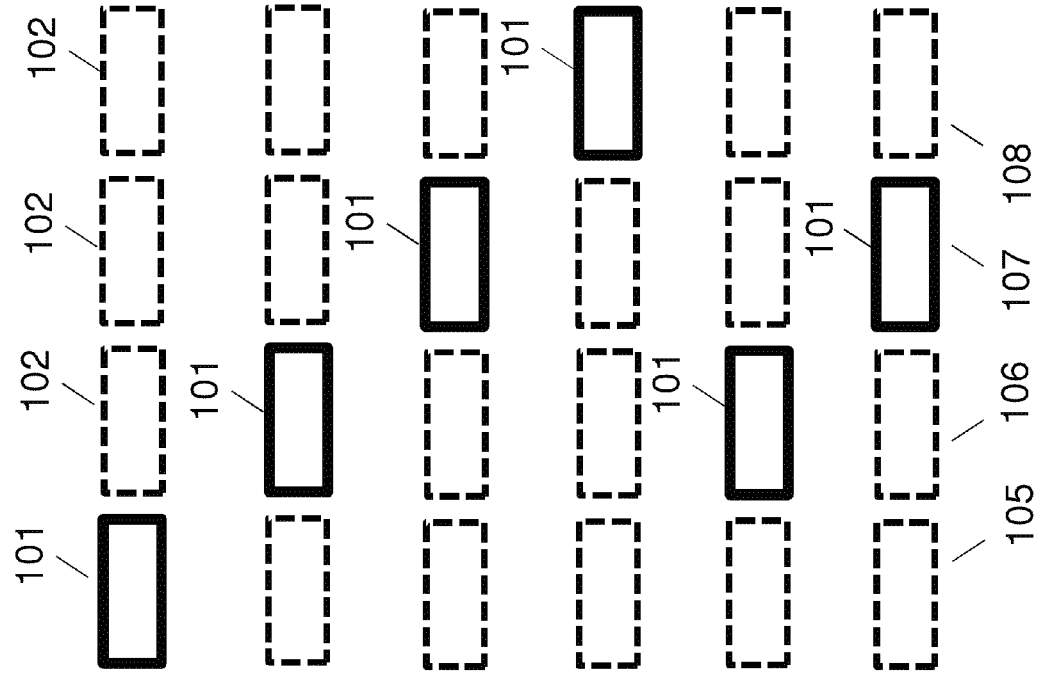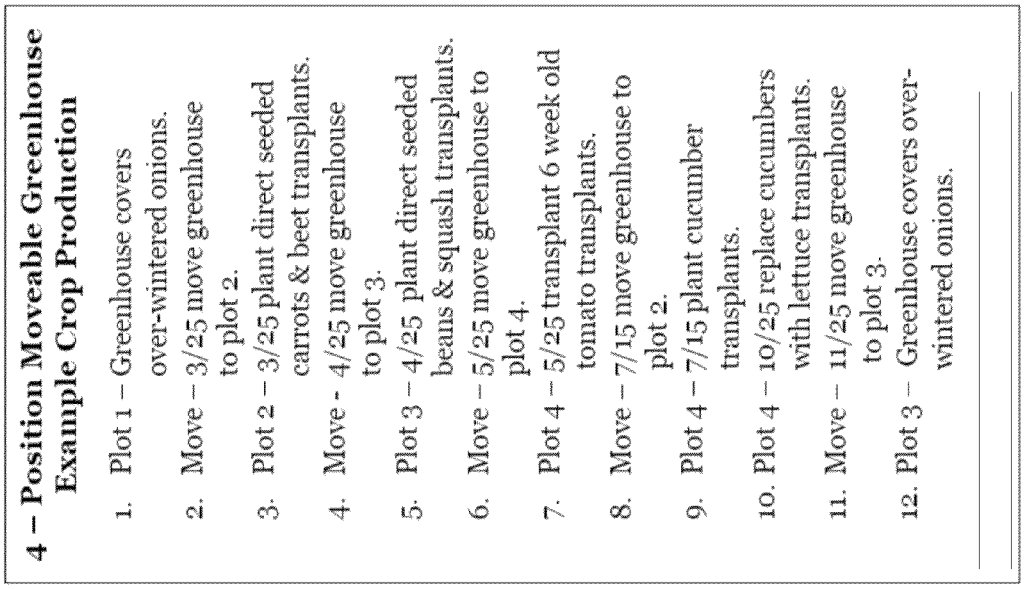
Figure 31

INTEGRATED MOVING AND ANCHORING SYSTEM FOR MOVABLE AGRICULTURE STRUCTURES

CROSS REFERENCE TO RELATED APPLICATIONS

This application claims benefit of priority under 35 U.S.C. §119(e) to the filing date of U.S. Provisional Application No. 61/412,748, as filed on Nov. 11, 2010, which is incorporated herein by reference in its entirety.

BACKGROUND OF THE INVENTION

Agriculture structures are a key component to farmer's ability to grow crop and raise animals, typically on a limited amount of space. Movable agriculture buildings increase the flexibility and viability of small-scale agriculture through extended the growing season and pasturing animals.

SUMMARY OF THE INVENTION

Embodiments of this invention increases the economically viability of small-scale agriculture including four season organic vegetable production and grazing livestock by integrating the moving and anchoring systems for movable agriculture structures.

Embodiments of the present invention relates to a movable greenhouse and track system. The movable greenhouse and track system may include a track configured to be anchored to a first plot of farming land and a second plot of farming land. The movable greenhouse and track system may further include a greenhouse is capable of being anchored to the track and an anchoring member. The greenhouse may include a series of hoops forming an interior area; a member attached to the hoops for keeping the interior area of the greenhouse a certain temperature different than a temperature from an area exterior to the greenhouse; and a member for facilitating movement of the greenhouse along the tunnel of the track. The interior area of the greenhouse may include the first plot of farming land. After a predetermined time, the member for facilitating movement allows the greenhouse to be moved from the first plot of farming land to the second plot of farming land.

Error! Reference source not found. a-b show implementations of how the V-track can be installed to anchor the track to the ground according to embodiments.

FIGS. 16a-d show implementations of the track according to embodiments.

FIGS. 17a-b shows track designs according to embodiments

Figure 18:
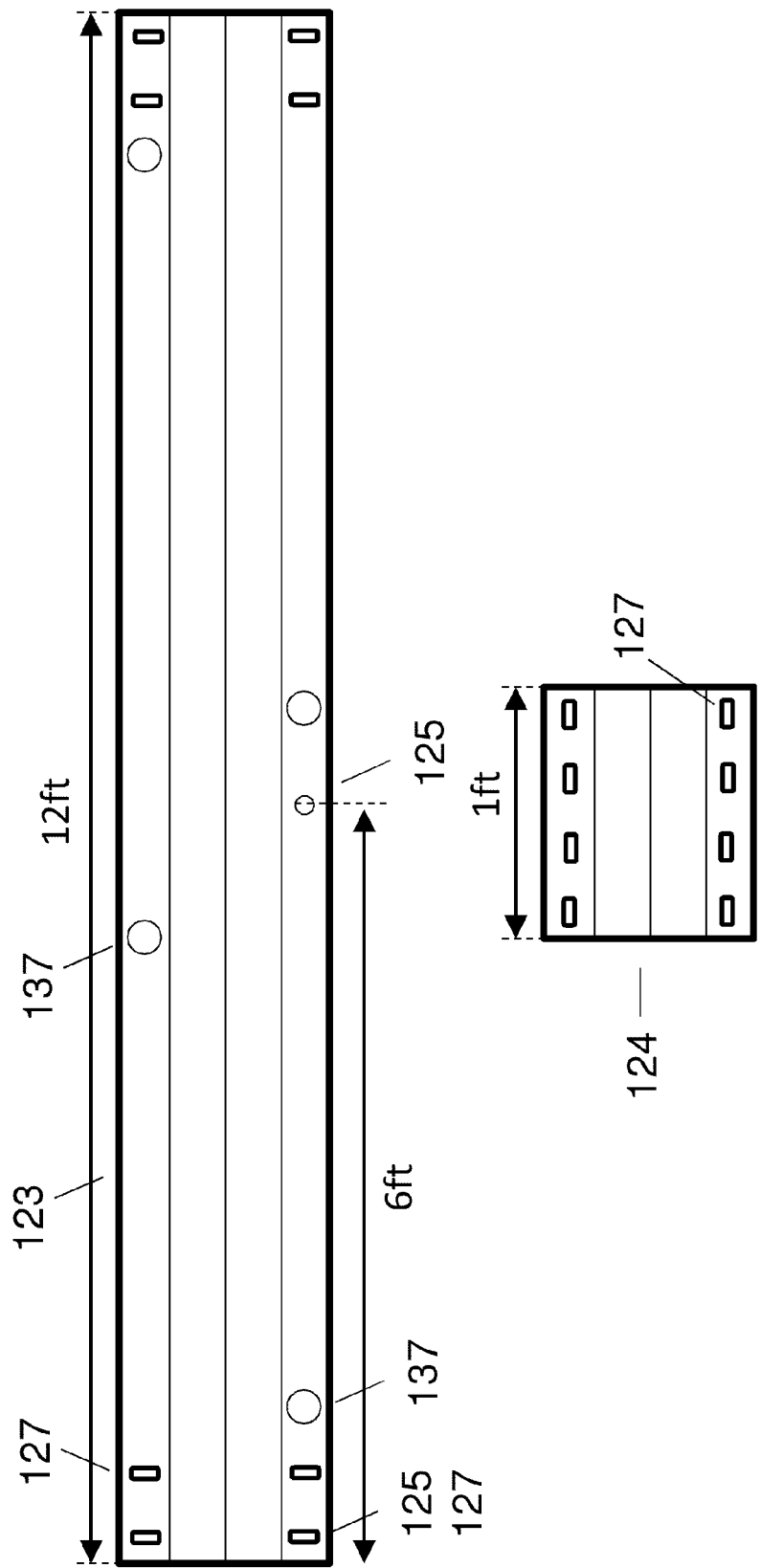

FIG. 18 shows a diagram of a single v-track section and a single v-track connector according to some embodiments.

Figure 19:
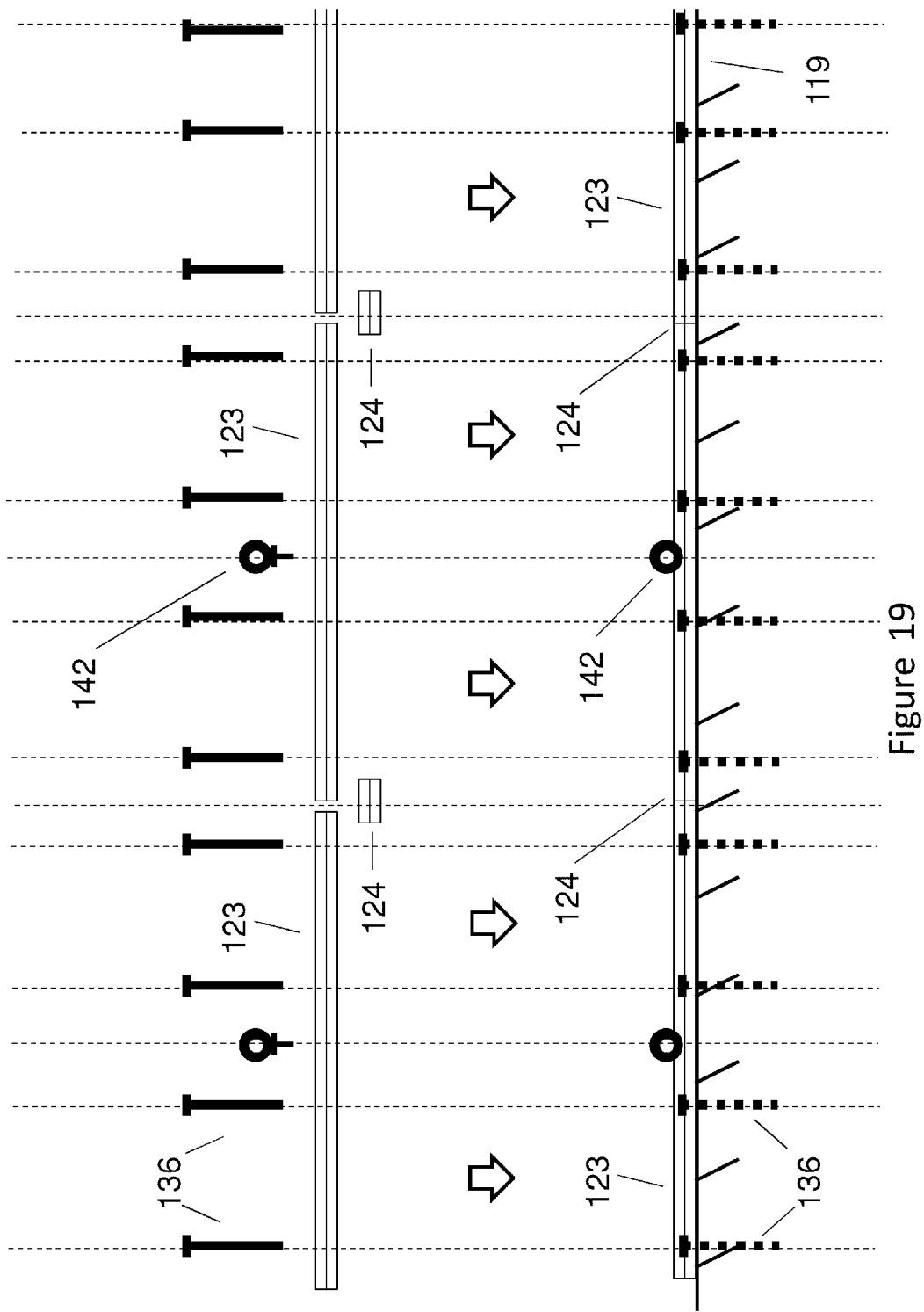

FIG. 19 shows a side view of the track pieces, connectors, track anchors the anchor eyes (or anchor points where to the structure is anchored to the track), and the track anchors according to embodiments.

Figure 20:
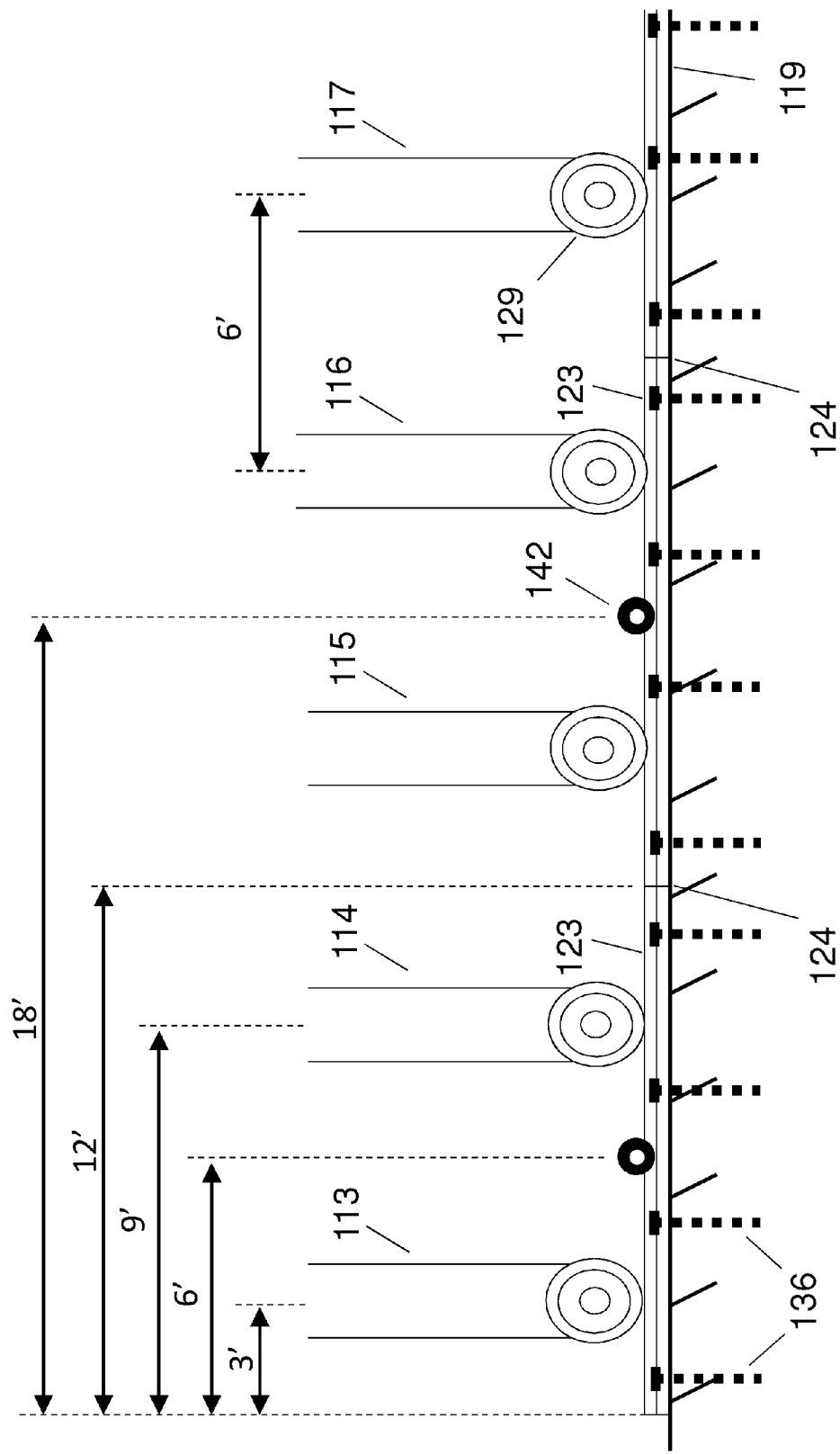

FIG. 20 shows the relative location of the anchor points to the hoops of the structure.

Figure 21B:
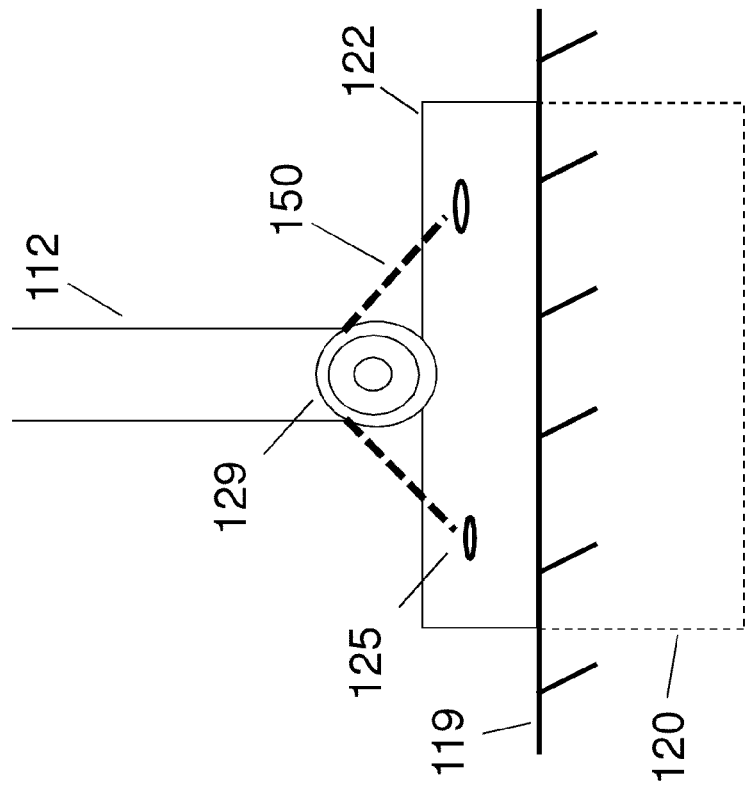
Figure 21A:
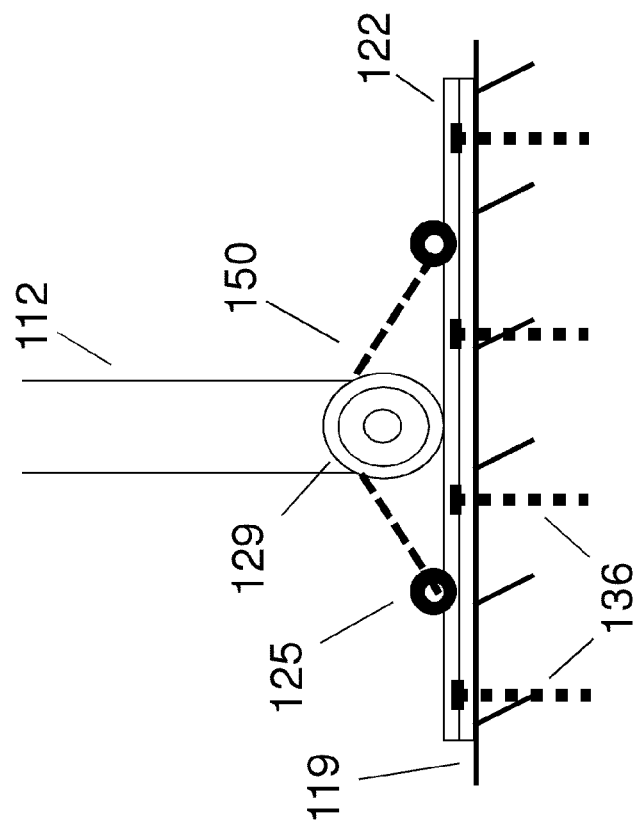

FIGS. 21a-b show how the structure can be anchored to the track according to embodiments.

Figure 22:
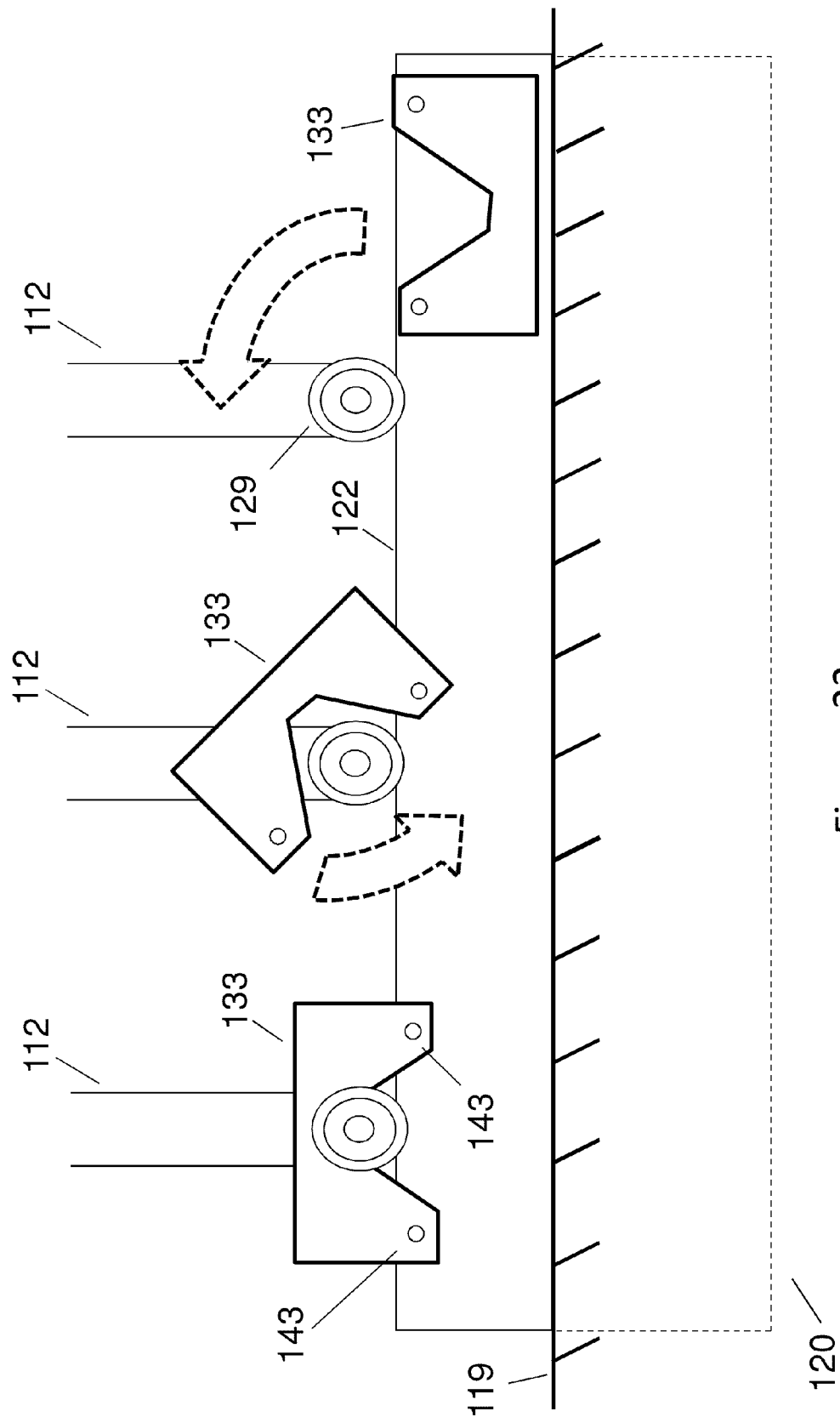

FIG. 22 shows another anchoring implementation working directly with the roller when a track sits on a permanent foundation according to embodiments.

Figure 23:
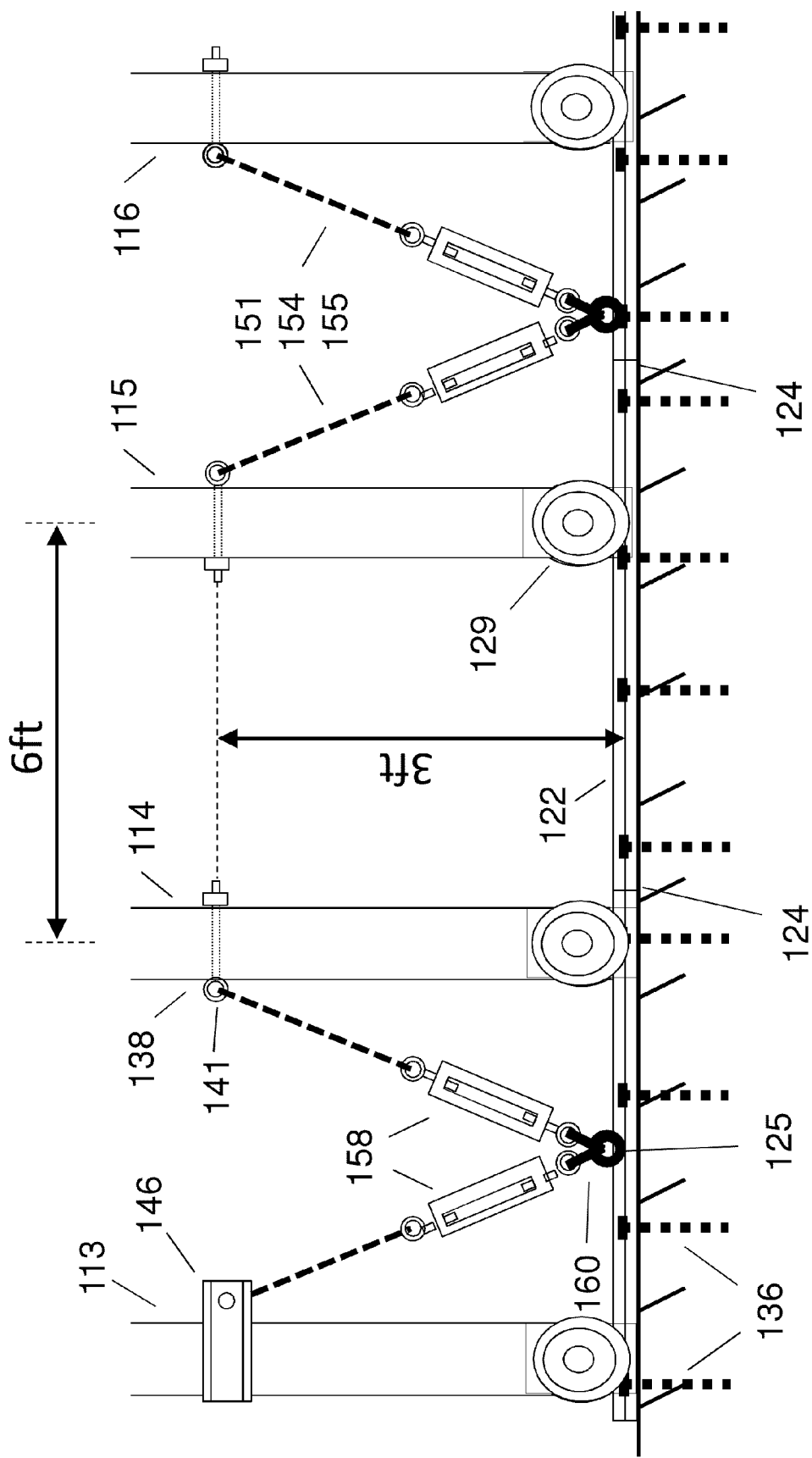

FIG. 23 shows how the structure is anchored to the track.

Figure 24:
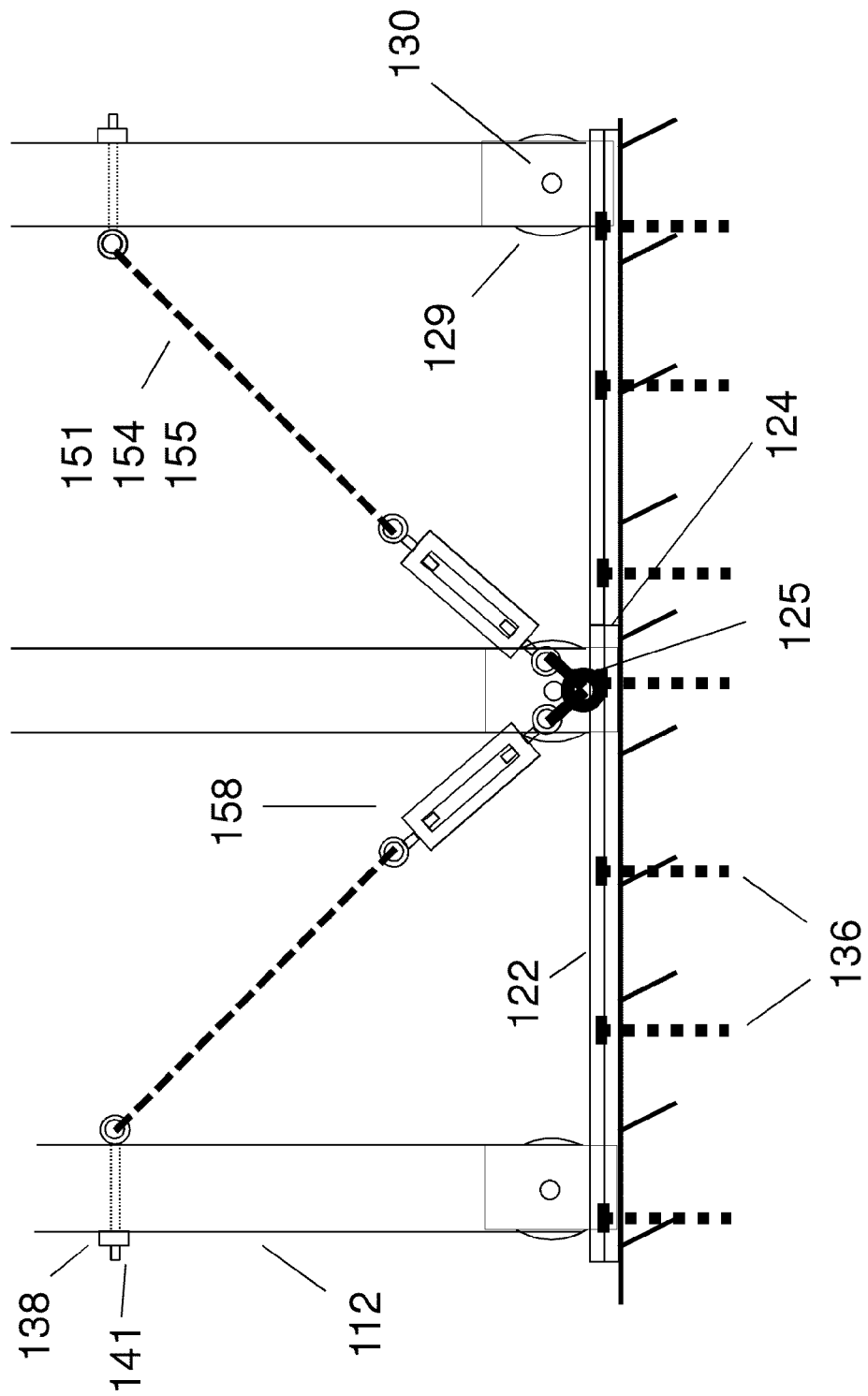

FIG. 24 represents an anchoring implementation in which the anchor eyes in the track are not set in between consecutive hoops according to embodiments.

Figure 25:
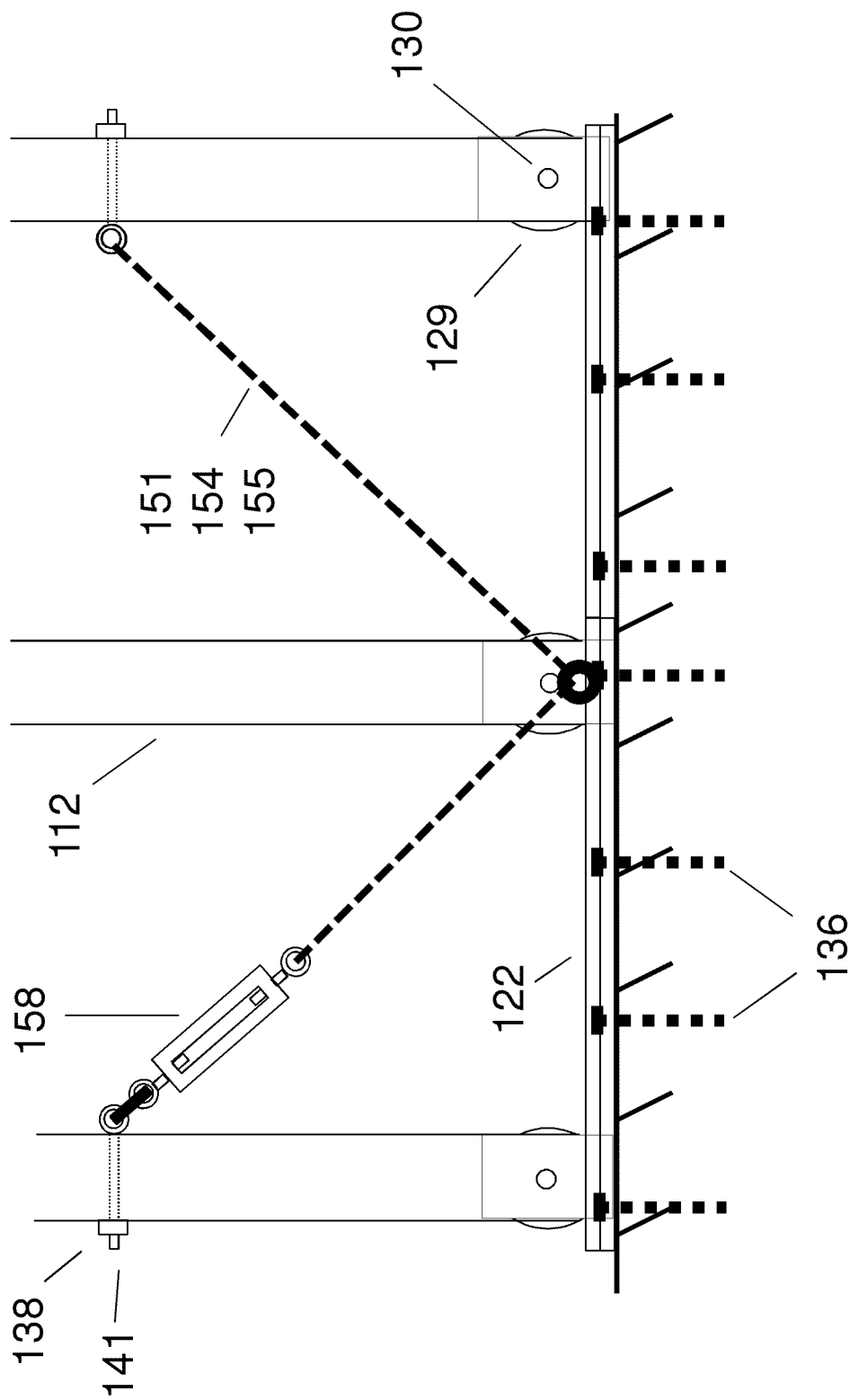

FIG. 25 shows anchoring in which the location of specific anchoring components is changed. In this example the turnbuckles are located at the tops of the anchoring system according to embodiments.

Figure 26A:
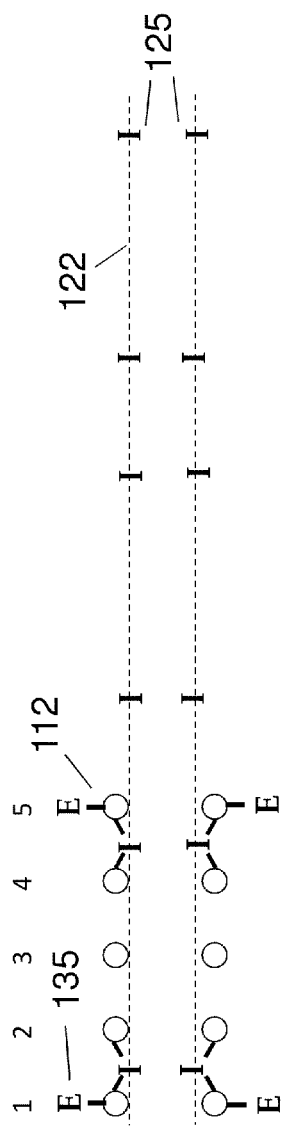
Figure 26B:
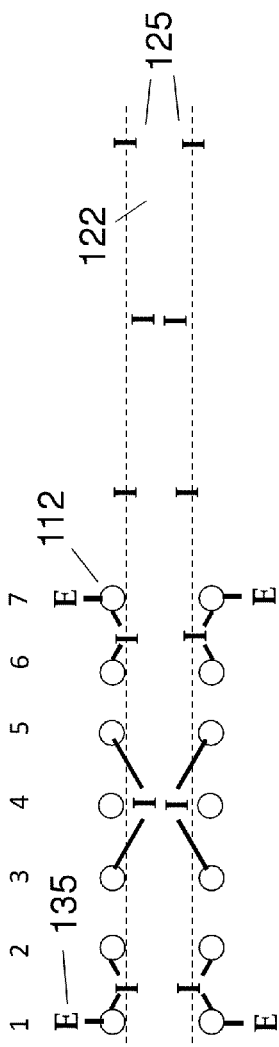
Figure 26C:
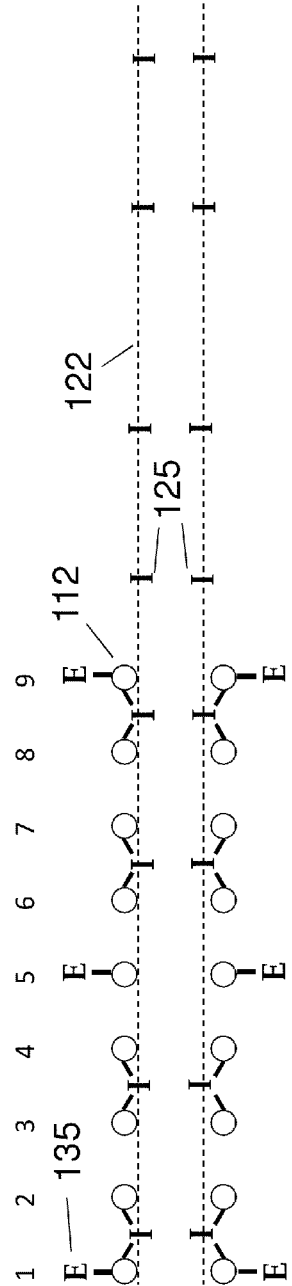

FIGS. 26a-c is a reference chart showing the various configurations for the V-track based on the size of the structure and the number of position.

FIGS. 27a-g show the anchoring system end according to embodiments.

FIGS. 28a-b shows how material can be secured to the attachment channel according to embodiments.

Figure 29:
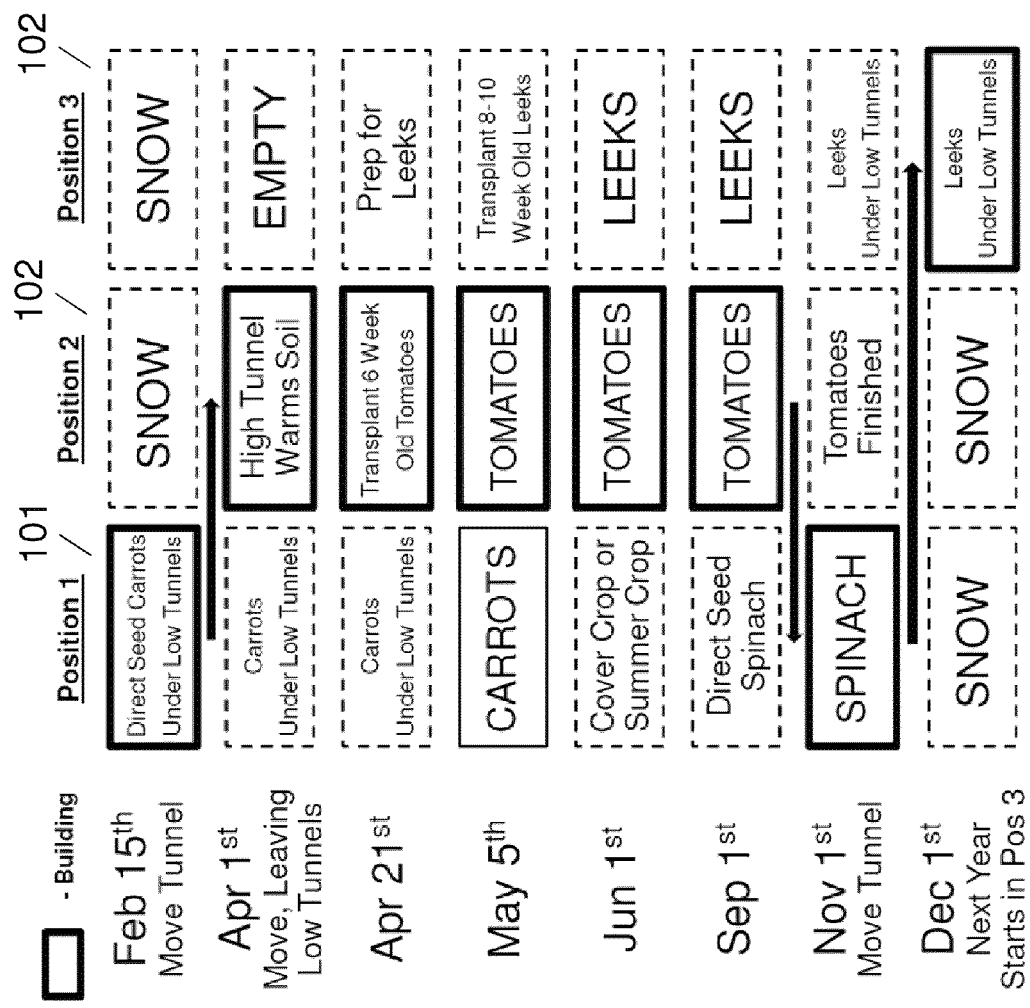

FIG. 29 shows a sample 3-position movable greenhouse rotation.

Figure 30:
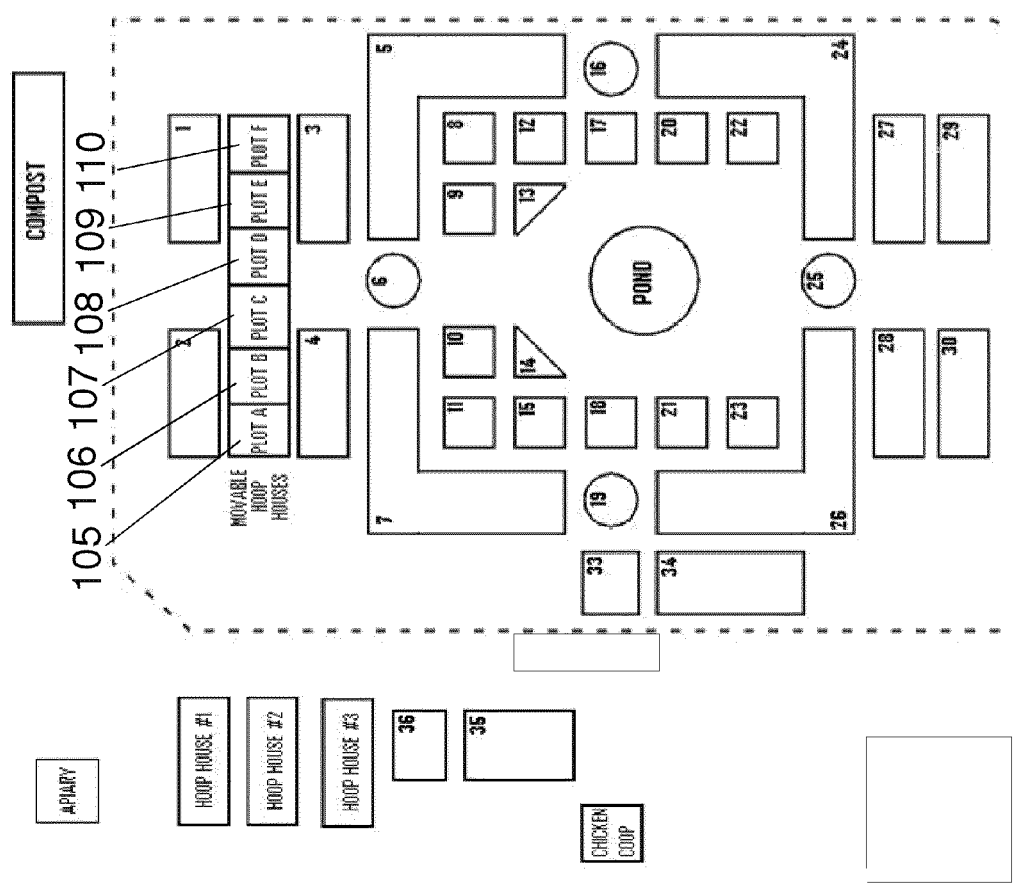

FIG. 30 shows an example in which 6 positions of track have been put together and two structures share those 6 locations on the same set of tracks according to embodiments.

FIG. 31 shows a sample movable greenhouse rotation in which 4 plots are used. In non moving structures crops are often limited to the single long season warm crop.

DETAILED DESCRIPTION OF THE INVENTION

Embodiments of this invention relate to movable agriculture buildings 101 that slide back and forth along a track or rails 122. A track or rail is anchored to the ground, pad, concrete, or footers. This track is anchored to the ground 119 or concrete 120 and the structure 101 is secured to the track 122. When the structure 101 needs to be moved, the structure 101 in unsecured from the track 122, moved to a new location 102 and then secured to the track 112. The entire structure 101 could be moved to a new position 102, or only moved for part of the length of the structure 101.

The present disclosure is discussed with reference to FIGS. 1-31. Before continuing with the application, a general overview of some of each of these Figures is presented below followed by a further description of these Figures.

Error! Reference source not found. is a diagram of the front view of the invention 101 according to some embodiments. The track 122 is secured to the ground 119. The roller 129 rests on the track. There is a hole in the sidewall hoop for a forged eye-bolt. A cable with a turn-buckle 133 connects the anchored track 136 to the structure 101. The structure is able to move to an alternate location 102, therefore anchoring the structure to the previously anchored track 102.

Figure 1:
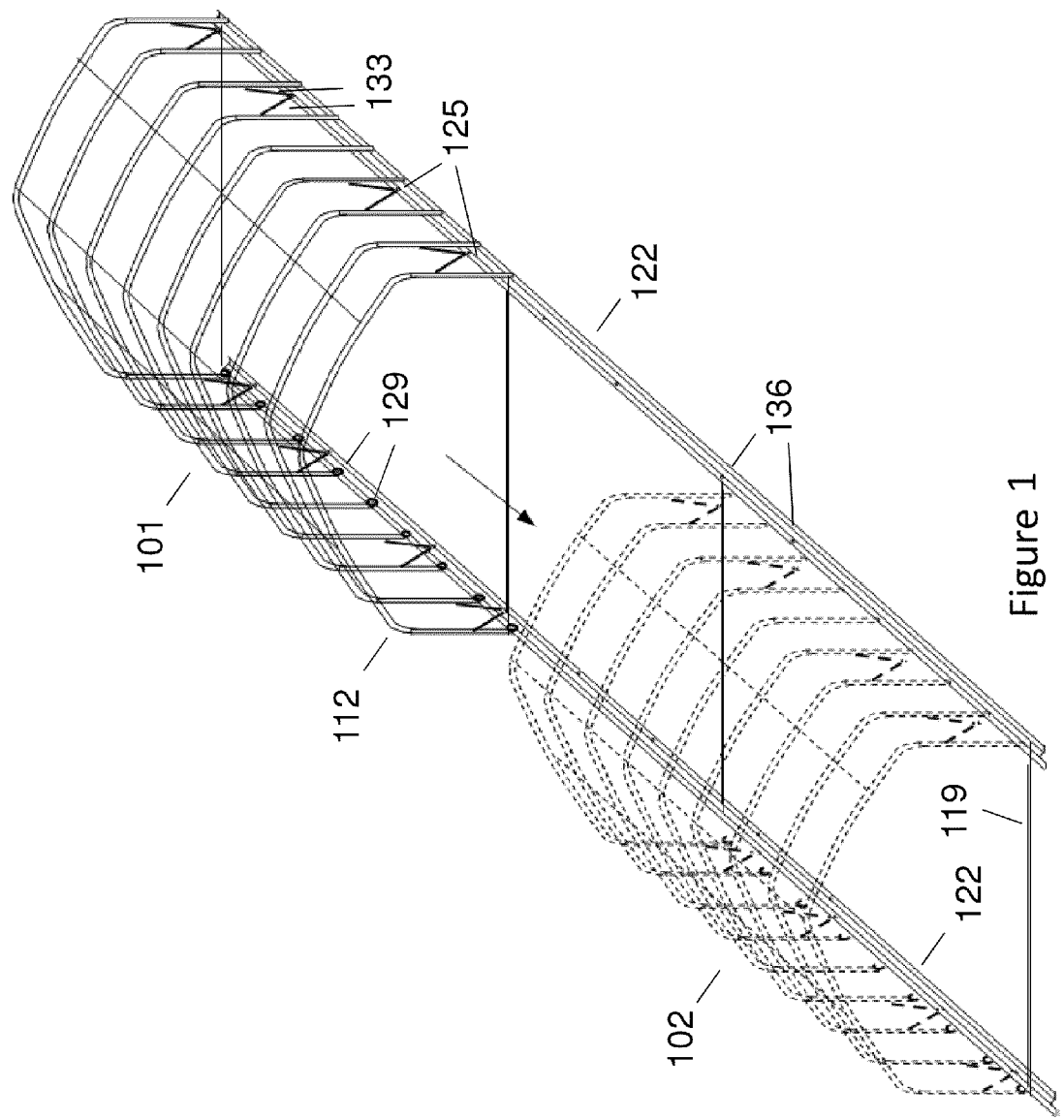
FIG. 1. is a diagram of the front view of the invention 101 according to some embodiments.

FIG. 1 is a diagram of the front view of the invention 101 according to some embodiments. The track 122 is secured to the ground 119. The roller 129 rests on the track. There is a hole in the sidewall hoop for a forged eye-bolt. A cable with a turn-buckle 133 connects the anchored track 136 to the structure 101. The structure is able to move to an alternate location 102, therefore anchoring the structure to the previously anchored track 102.

Figure 2:
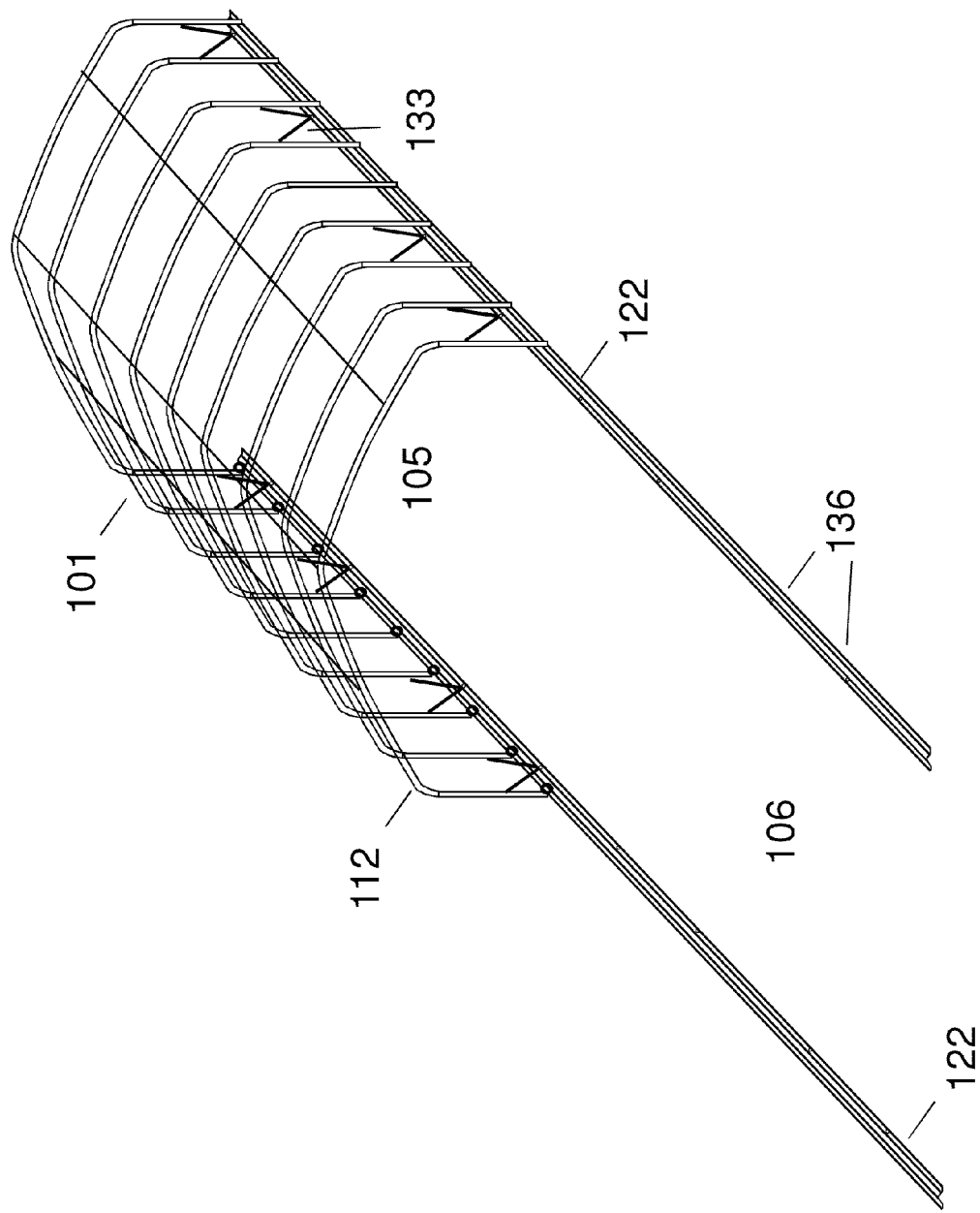
FIG. 2. shows both sides of the structure 101 according to some embodiments.

FIG. 2 shows both sides of the structure 101 according to some embodiments. Here the rollers are on the inside; however rollers are locatable on either side of the sidewall hoops. Both sides of the track 122 are anchored 136 and both sides of the structure are anchored to the track.

Figure 3:
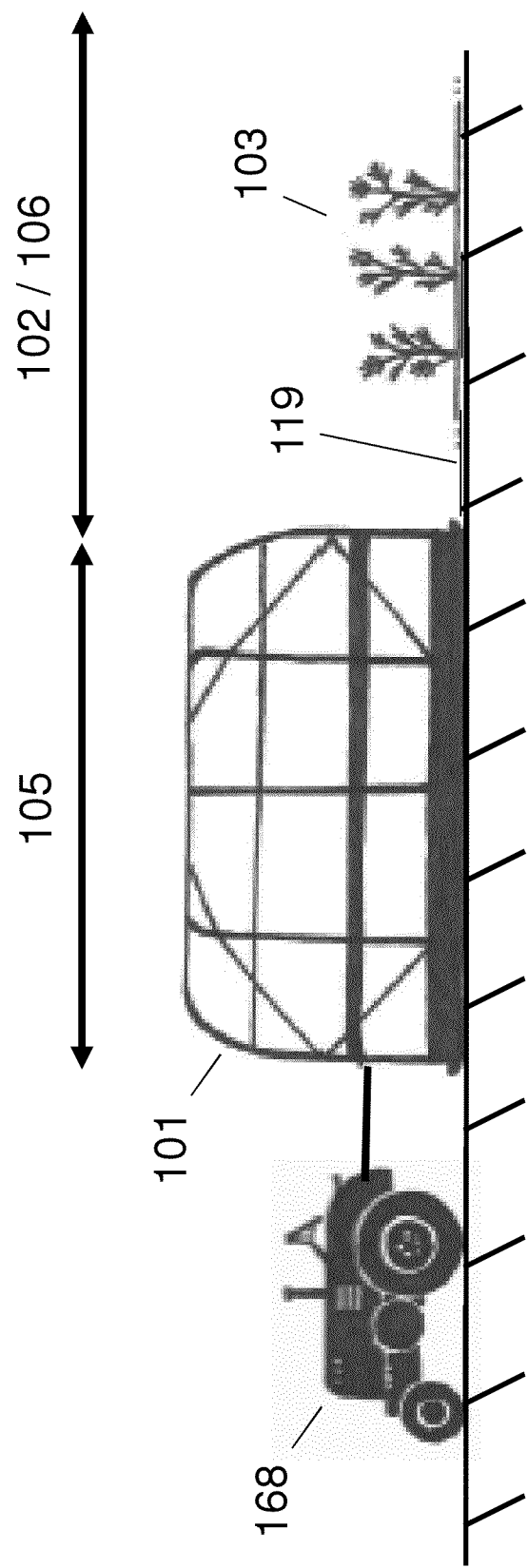
FIG. 3. shows the structure 101 attached to in a first position location 105 according to some embodiments.

FIG. 3 shows the structure 101 attached to in a first position location 105 according to some embodiments. In this example the structure has been moved by a tractor 168 from its second position 106 where crops 103 were growing underneath the cover of the movable structure 101 in the ground 119. This could be the structure being moved between any number of locations.

Figure 5:
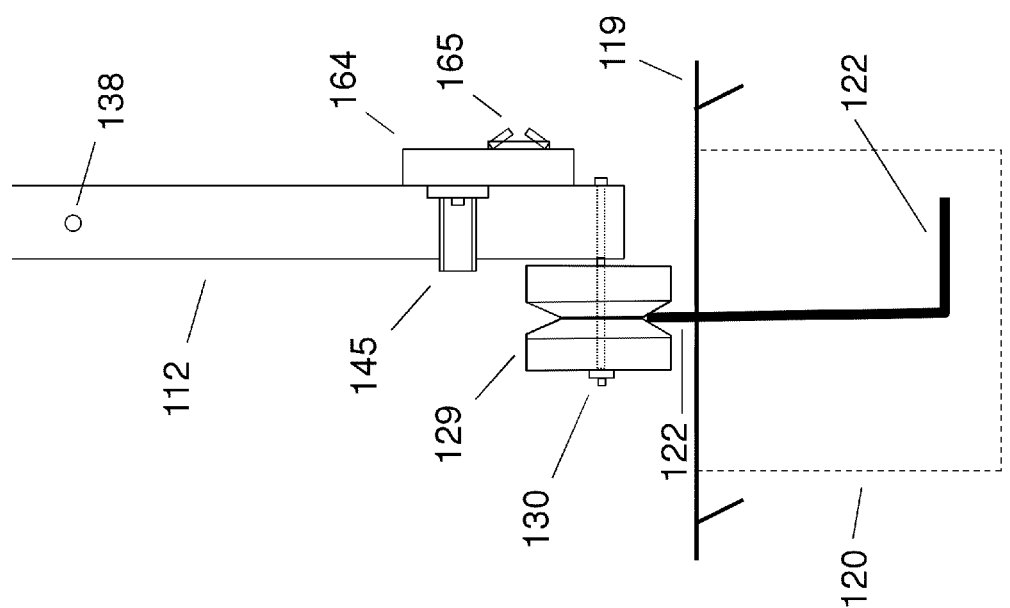
FIG. 5 shows another iteration of the structure sitting on a track 122 that has been set with a concrete foundation 120 according to some embodiments.

FIG. 5 shows another iteration of the structure sitting on a track 122 that has been set with a concrete foundation 120 according to some embodiments. Here the track acts like more of a rail for the structure to sit on. This could be beneficial if working to set a movable structure on uneven ground, at which point the track could be adjusted as set in the concrete foundation.

Figure 4:
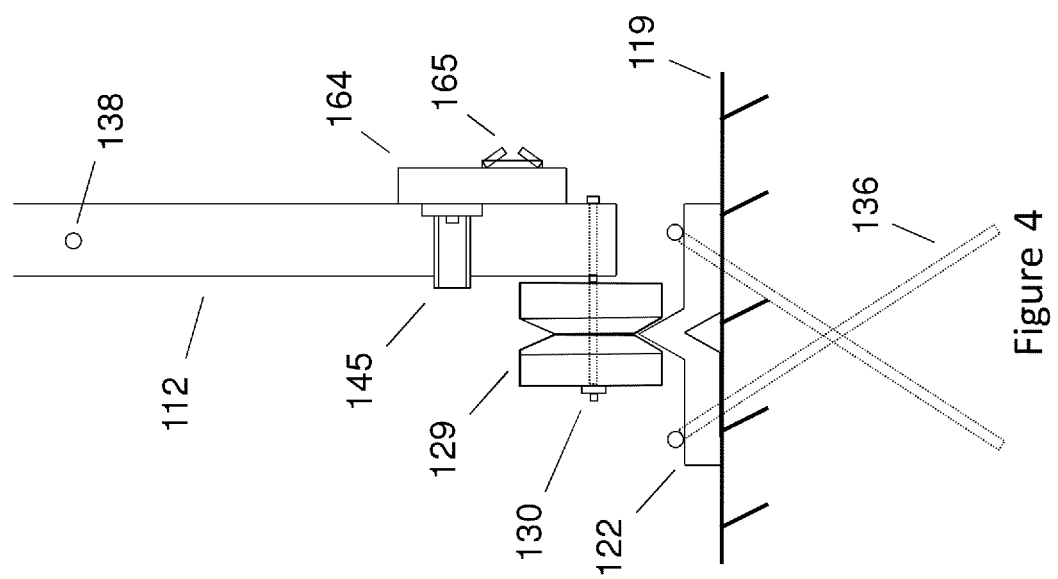
FIG. 4 shows an end view of the sidewall hoop 112 with attached roller sitting on the anchored track and baseboard 164 according to some embodiments.
Figure 6:
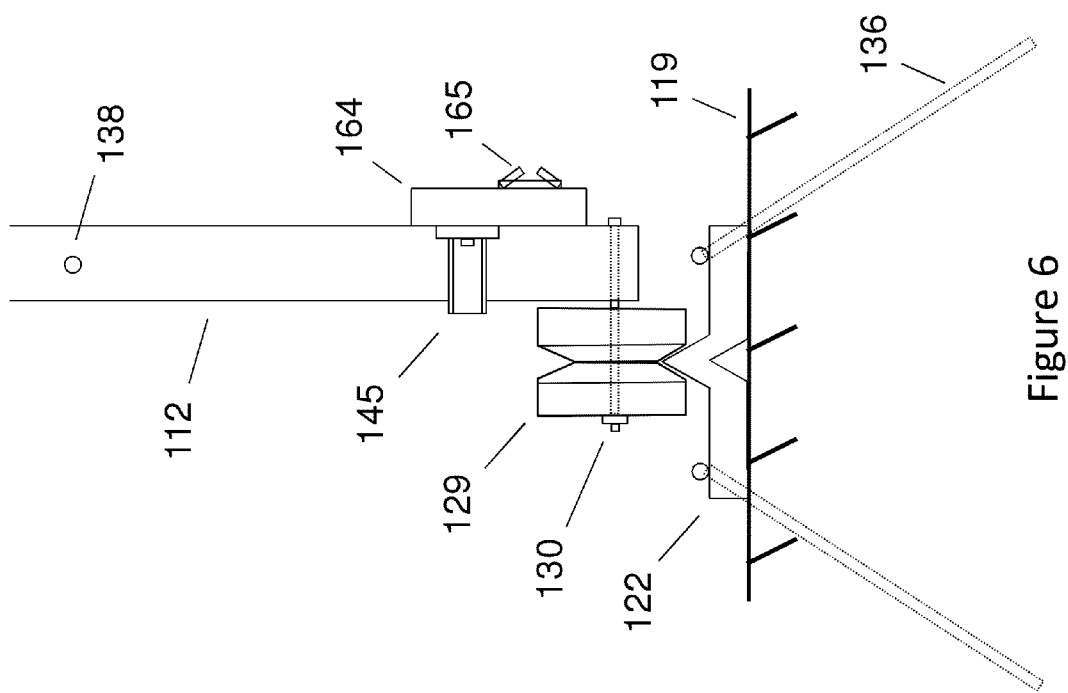
FIG. 6 show that the track anchors 136 can be situated in multiple ways, in this specific example they are facing away from themselves, according to some embodiments.

FIG. 6 show that the track anchors 136 can be situated in multiple ways, in this specific example they are facing away from themselves, as opposed to that seen in FIG. 4 where they are situated to cross according to some embodiments.

Figure 7:
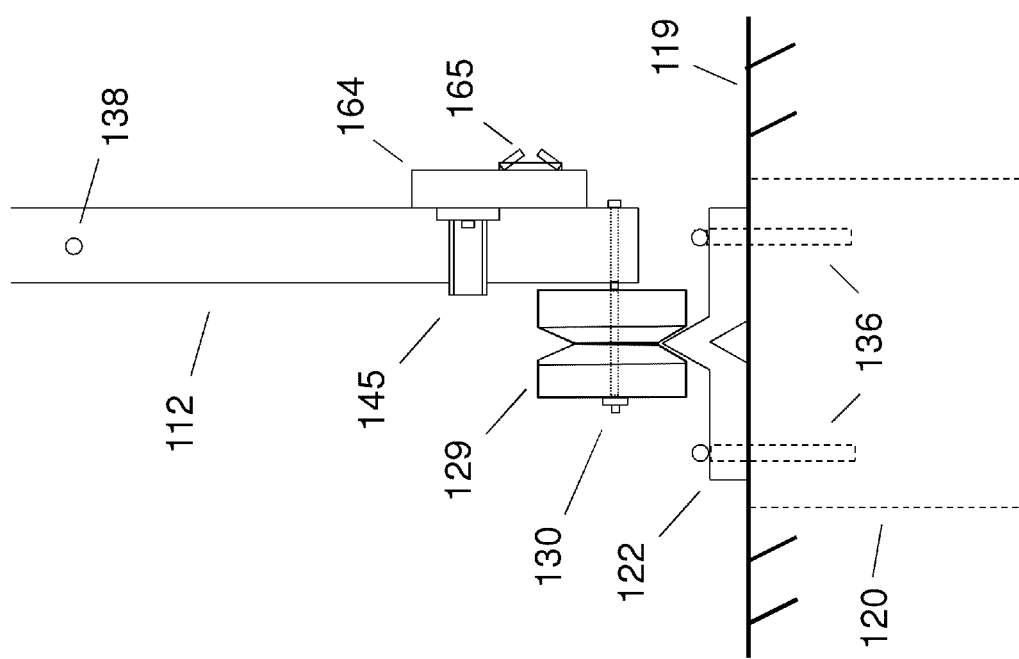
FIG. 7 shows the track being anchored to the concrete foundation 120 according to some embodiments.

FIG. 7 shows the track being anchored to the concrete foundation 120 according to some embodiments. A concrete foundation could be set along the length of the track with the intention of setting all of the v-track sections 123 on the foundation. Another way this can be done is to simply use the concrete foundation to act as v-track connectors 127 and the rest of the track resting on the ground.

Figure 8:
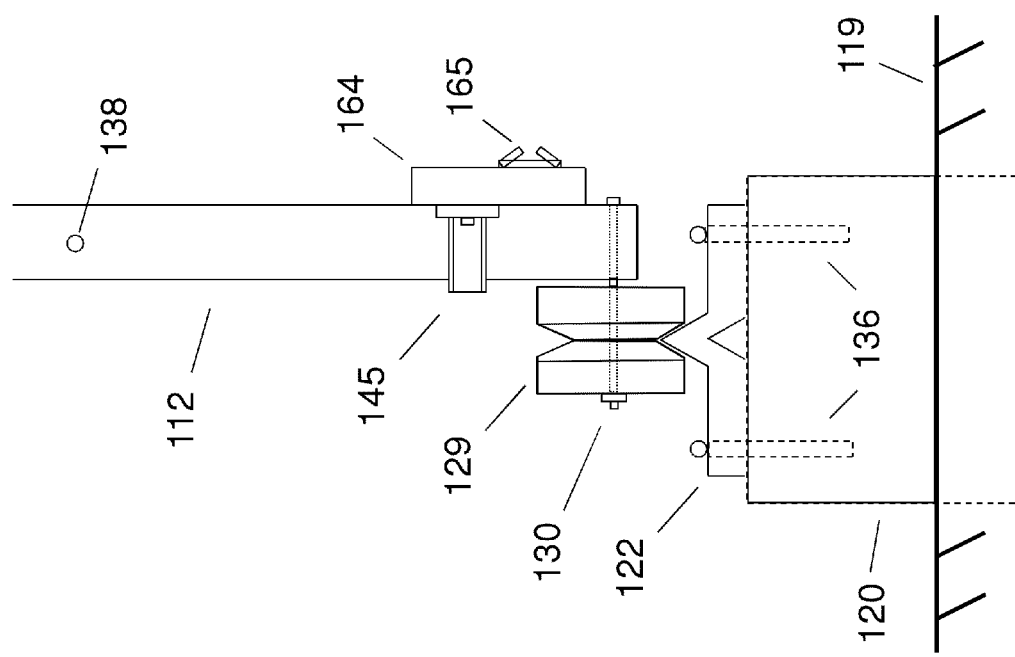
FIG. 8 shows the track being anchored on to the concrete foundation in such a way where the track is elevated off the ground according to some embodiments.

FIG. 8 shows the track being anchored on to the concrete foundation in such a way where the track is elevated off the ground according to some embodiments. This could be used in such a way that is also a benefit for those working with uneven ground where leveling would be a detriment to the soil. Another application of this would be in an urban setting where the structures are built on footers with the intention of filling the space between the concrete foundation with soil to act as a raised bed. This would be beneficial is working on ground that is rock or concrete or if the soil was previously contaminated with something such as heavy metals.

Figure 9:
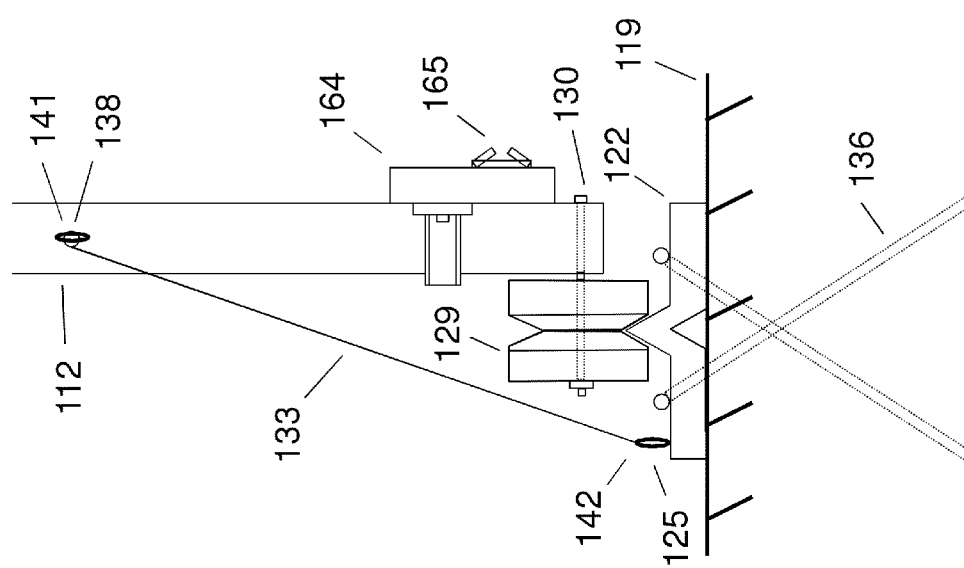
FIG. 9 show the profile of the structure and a method of anchoring the structure to the track according to some embodiments.

FIG. 9 show the profile of the structure and a method of anchoring the structure to the track according to some embodiments. The sidewall hoop has been set with a forged eye bolt 141 to secure the anchoring mechanism to the hoop. The endwall hoop 113 on either end uses a brace band 146 and brace band bolt 147 in place of the eye bolt. Hoops 2, 3, and 4 114-116 from either end use the same eye bolt and securing mechanism. Located on the track is also a forged anchor eye 142 located in an anchor point 125 located in the track itself, which have been pre-drilled and are located throughout the track to be able to allow for efficient movement between multiple plots 105-110. A single track anchor point in this example anchors consecutive hoops.

Figure 10:
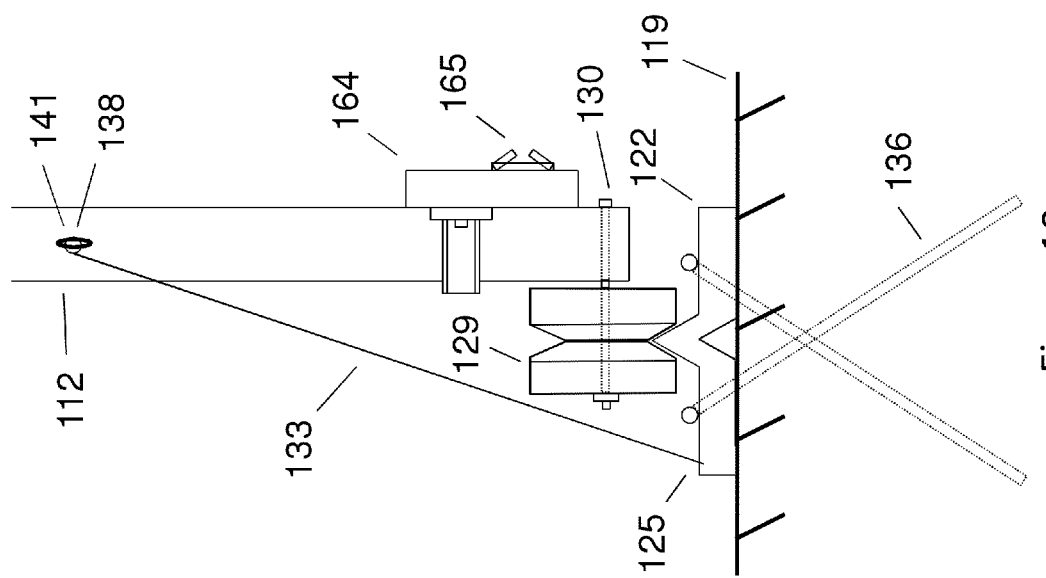
FIG. 10 shows the profile of the structure and anchoring system with a variation in which the structure is anchored directly to the track with the use of a quick link 160 or shackle 161 according to some embodiments.

FIG. 10 shows the profile of the structure and anchoring system with a variation in which the structure is anchored directly to the track with the use of a quick link 160 or shackle 161 according to some embodiments.

Figure 11:
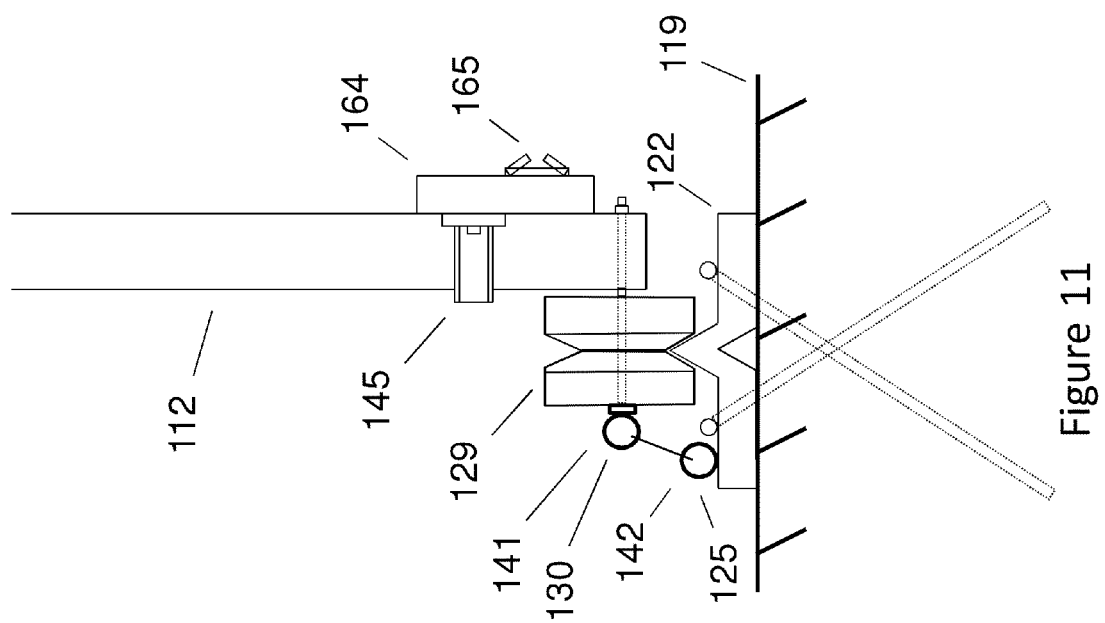
FIG. 11 shows the profile of the structure and anchoring system with a variation in which the wheel axle has a forged eyelet which allows the structure to be anchored at each wheel point to the track directly below according to some embodiments.

FIG. 11 shows the profile of the structure and anchoring system with a variation in which the wheel axle has a forged eyelet which allows the structure to be anchored at each wheel point to the track directly below according to some embodiments.

Figure 12:
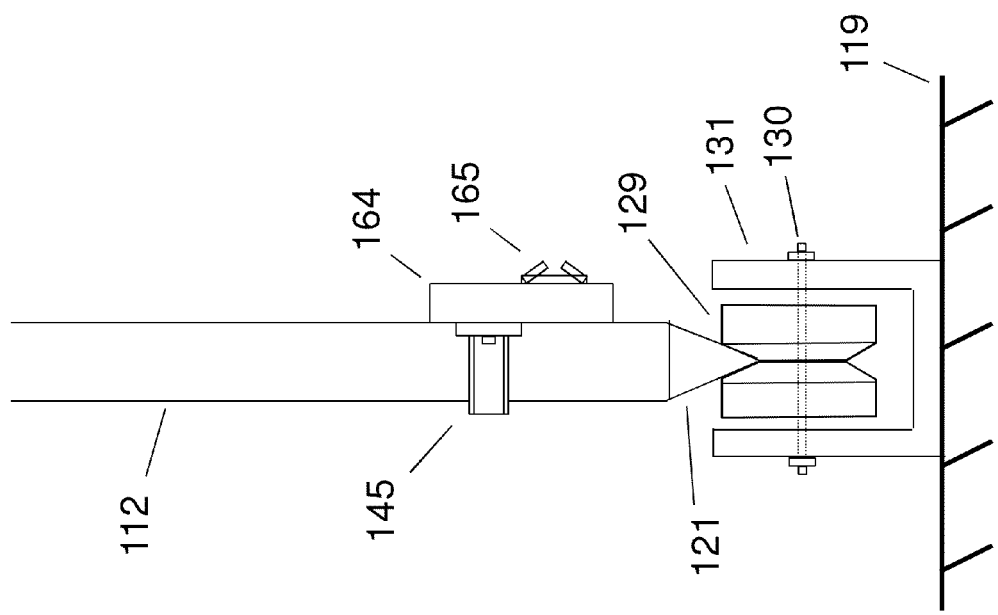
FIG. 12 shows an alternate structure to track mounting approach where the rail 121 is mounted to the bottom of all of the hoops 112 and then sits on the rollers 129 mounted into the roller holder 131 according to some embodiments.

FIG. 12 shows an alternate structure to track mounting approach where the rail 121 is mounted to the bottom of all of the hoops 112 and then sits on the rollers 129 mounted into the roller holder 131 according to some embodiments.

Figure 13:
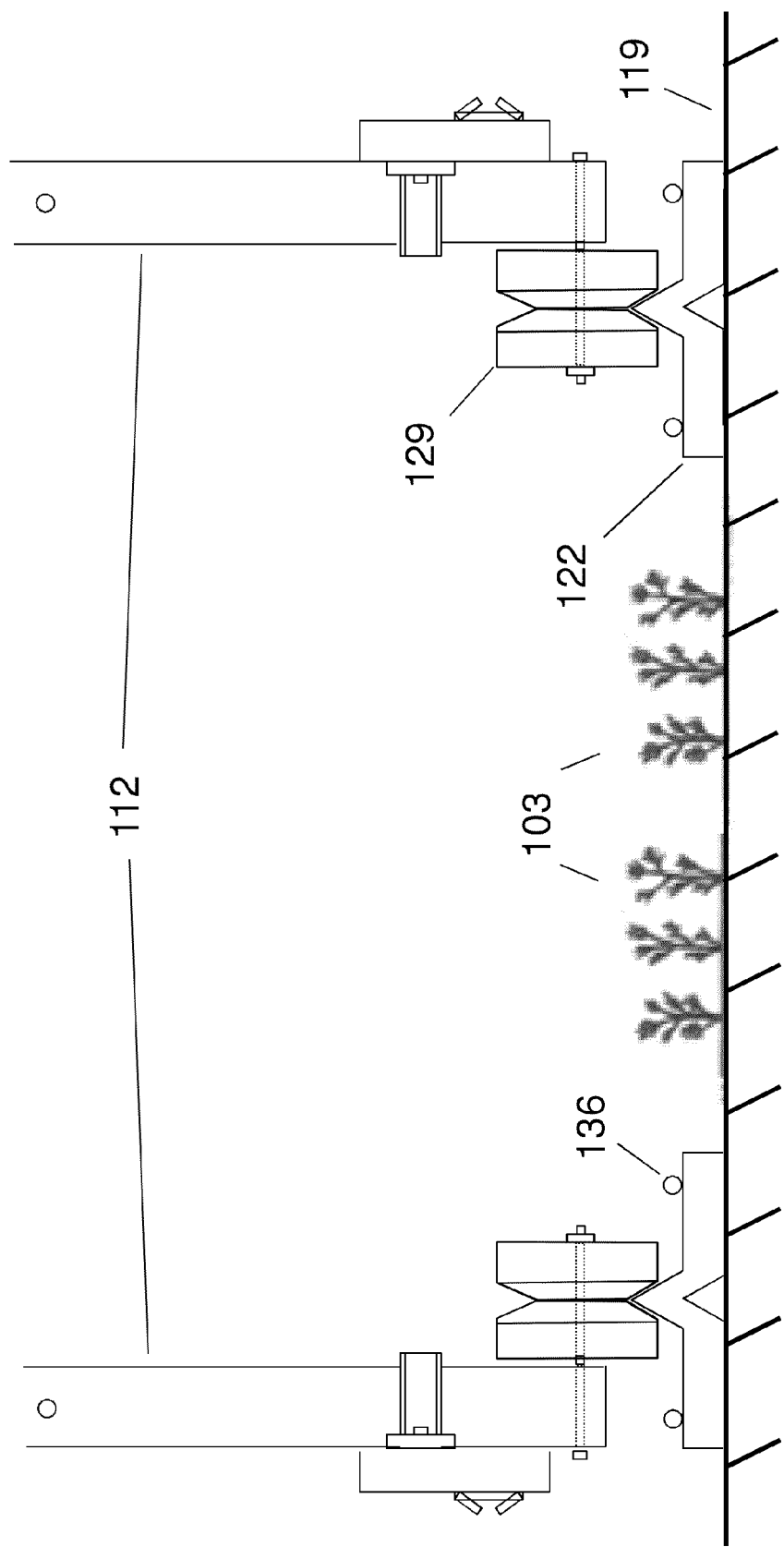
FIG. 13 is a diagram showing how the track 122 and hoops 112 are set across the width of the structure according to some embodiments.

FIG. 13 is a diagram showing how the track 122 and hoops 112 are set across the width of the structure according to some embodiments. In this example the wheels are placed on the inside of the hoops; they can just as easily be placed on the outside of the structure, which could increase the amount of potential growing space under the structure.

Figure 14A:
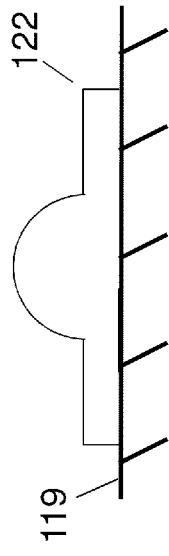
FIG. 14a shows a profile of the original track design with a roller to fit the track according to some embodiments.
Figure 14C:
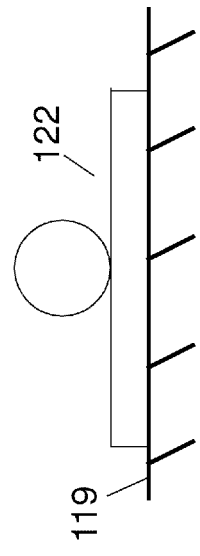
FIG. 14c shows another possible track iteration.
Figure 14E:
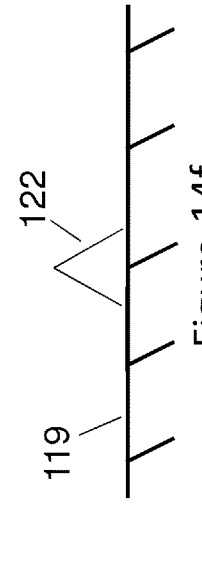
FIG. 14e shows another possible track iteration.
Figure 14G:
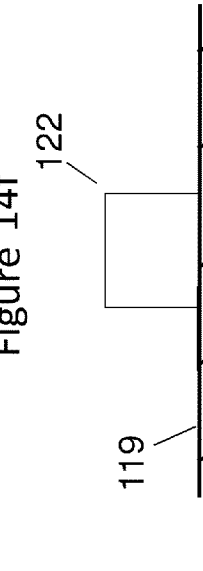
FIG. 14g shows another possible track iteration.

FIG. 14a shows a profile of the original track design with a roller to fit the track according to some embodiments.

Figure 14B:
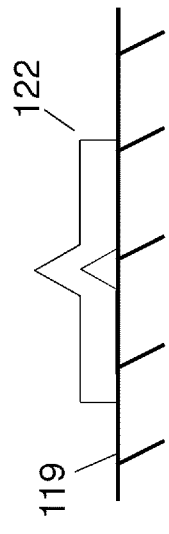
FIG. 14b shows another profile of the track using a different groove that would provide a greater surface area for the roller to sit according to some embodiments.
Figure 14D:
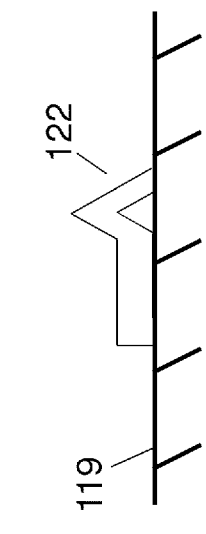
FIG. 14d shows another possible track iteration.
Figure 14F:
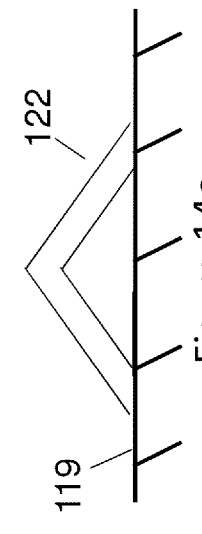
FIG. 14f shows another possible track iteration.
Figure 14H:
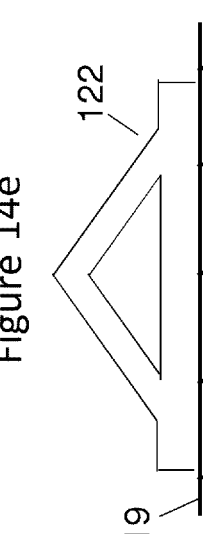
FIG. 14h shows another possible track iteration.

FIG. 14b shows another profile of the track using a different groove that would provide a greater surface area for the roller to sit according to some embodiments.

FIGS. 14c-h show other possible track iterations.

Figure 15B:
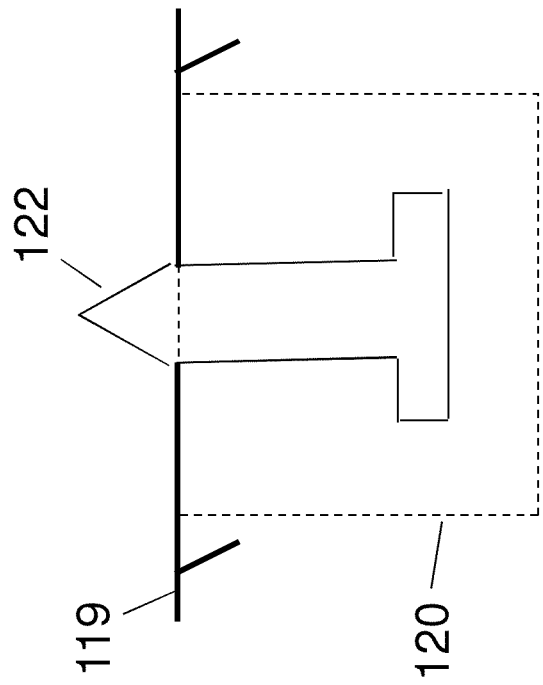
Figure 15A:
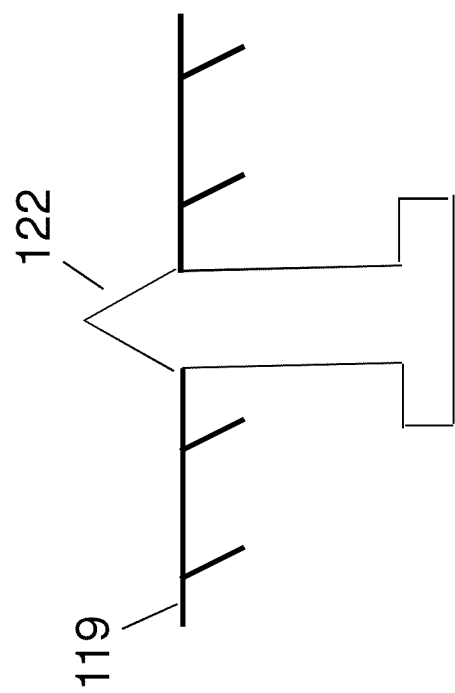

FIG. 15a shows another implementation of how the V-track can be installed to anchor the track to the ground. Additional methods have been to use concrete footers to seam the track instead of the track connectors or to use concrete slabs under the entire length of the v-track and bolt the v-track to the slab.

FIG. 15b shows another implementation of how the V-track can be installed to anchor the track to the ground.

Figure 16A:
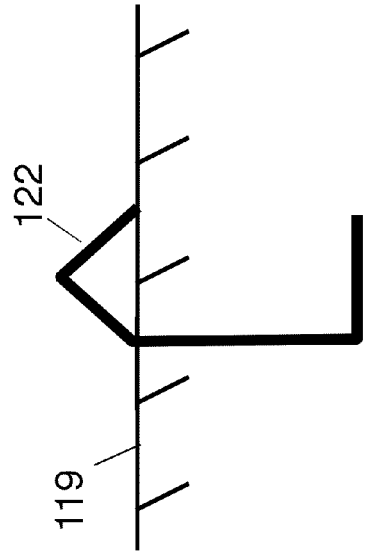

FIG. 16a shows another implementation of the track set in a soil foundation and the way in which that track can be altered to shift the method of anchoring the track to the ground.

Figure 16B:
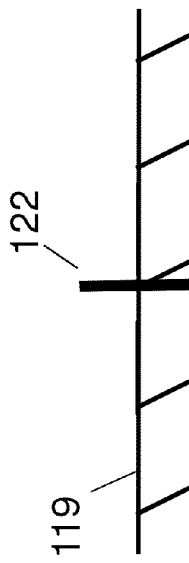

FIG. 16b shows another implementation of the track set in a soil foundation and the ways in which that track can be altered.

Figure 16C:
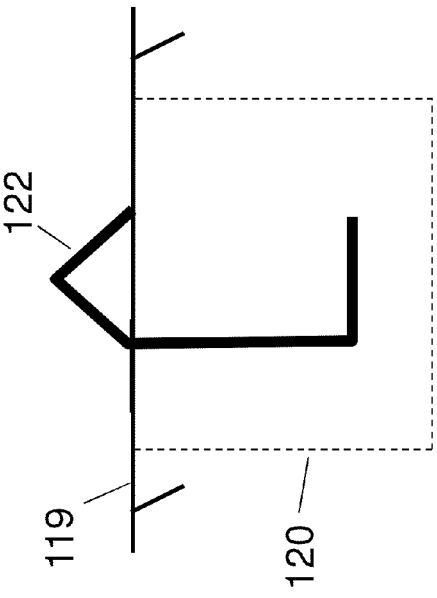

FIG. 16c shows another implementation of the track set in a concrete foundation and the way in which that track can be altered to shift the method of anchoring the track to the ground.

Figure 16D:
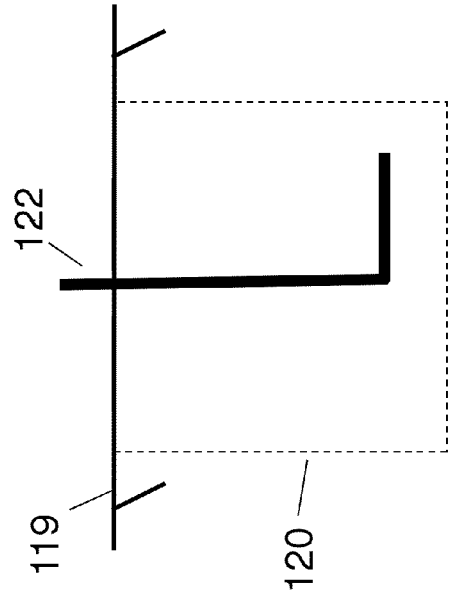

FIG. 16d shows another implementation of the track set in a concrete foundation and the ways in which that track can be altered.

FIG. 17b shows the same track design as FIG. 17a, however a motor 169 has been added. This is shown to highlight the various embodiments of this concept. This would be applicable in many situations, an example of which would be to automate movement when a specific weather incident presents. For example, if a crop is being tested for drought tolerance. The crop could be exposed to an outdoor environment and when it begins to rain a sensor could automate the movement of the structure to cover the crop that is being tested for drought tolerance to continue the research in a place that doesn't actually suffer from drought.

FIG. 18 shows a diagram of a single v-track section 123 and a single v-track connector 124 according to some embodiments. The v-track section has been prepared with holes 137 for the t-bar anchors 134. At either end of each track section are v-track connector holes 127 that are set to connect track sections together. The track connectors are placed on the underside of each section of track so as to allow uninhibited movement of the structure from section to section.

FIG. 19 shows a side view of the track pieces, connectors, track anchors the anchor eyes (or anchor points where to the structure is anchored to the track), and the track anchors. Supplemental earth augers 135 are used for additional anchoring. These earth augers can be used to provide additional anchoring to the track and/or to the structure.

FIG. 20 shows the relative location of the anchor points to the hoops of the structure. Although the anchor point can secure to the bottom of each hoop, placing the anchor point in the center of the hoops 142 allows one anchor point to be secured to two hoops and allows the cable used for anchoring to also provide diagonal bracing in the sidewalls of the structure. The V-track is designed for the seams and overlaps to correspond with the hoop spacing. When anchor points land on a track seam, a track connector bolts is replaced with a forged anchor eye.

FIG. 21a shows how the structure can be anchored to the track. There are many implementation of this design. As shown, a forged eye-bolt is installed in the sidewall hoop and a forged anchor eye is installed in the track.

FIG. 21b shows another implementation in which structure is similarly anchored as in FIG. 21a although in this setting directly to the track or foundation without eyebolts.

FIG. 22 shows another anchoring implementation working directly with the roller when a track sits on a permanent foundation. The hinged anchor has the ability to rotate and lock into the foundation and therefore holding the structure in a set location.

FIG. 23 shows how the structure is anchored to the track. There are many implementations of this design. As shown, the connector 150, a forged eye-bolt is installed in the sidewall hoop and a forged anchor eye is installed in the track. The two are connected with a wire 151, wire thimbles 154, wire clamps 155, quick links 160, and turn-buckles 161. The turn-buckles are tight when anchored and are loosened when unanchored and the structure is moved. The anchor eyes stay bolted to the track, and the rest of the hardware moves with the structure. In the next position the anchor eyes are already installed in the correct location and the hardware can easily be reattached.

FIG. 24 represents an anchoring implementation in which the anchor eyes in the track are not set in between consecutive hoops. Another points in the track can be located anywhere on the track, in between hoops, at hoops, and between sets of hoops.

FIG. 25 shows anchoring in which the location of specific anchoring components is changed. In this example the turn-buckles are located at the tops of the anchoring system.

FIG. 26a is a reference chart showing the various configurations for the V-track based on the size of the structure and the number of position. This chart ensures that the anchor points are installed correctly for each position and that the track anchoring aligns with the structure at each location. This highlights how the track spacing and layout interacts with the structure and the hoop spacing. It also shows how the anchor points are installed for all positions in the beginning.

FIG. 26b is a reference chart showing the various configurations for the V-track based on the size of the structure and the number of position. This chart ensures that the anchor points are installed correctly for each position and that the track anchoring aligns with the structure at each location. This highlights how the track spacing and layout interacts with the structure and the hoop spacing. It also shows how the anchor points are installed for all positions in the beginning.

FIG. 26c is a reference chart showing the various configurations for the V-track based on the size of the structure and the number of position. This chart ensures that the anchor points are installed correctly for each position and that the track anchoring aligns with the structure at each location. This highlights how the track spacing and layout interacts with the structure and the hoop spacing. It also shows how the anchor points are installed for all positions in the beginning.

FIG. 27a shows the anchoring system end with wire thimble, wire clamps, and wire.

FIG. 27b represents turnbuckles used to tighten anchor systems.

FIG. 27c represents quick links used to secure anchor system to eye bolts in the track.

FIG. 27d represents an alternate to the quick link.

FIG. 27e represents a brace band that is used in place of eye bolts in the sidewall hoops on the endwall locations.

FIG. 27f represents an alternative to FIG. 27a.

FIG. 27g represents a yolk to yolk turnbuckle used on the exterior anchoring system of the structure. These are used in conjunction with earth augers and forged-eye bolts on the bottom of the sidewall hoops.

FIG. 28a shows how material can be secured to the attachment channel from the top of the structure and from the bottom of the structure. Plastic covering the structure is commonly brought down from the top. On the bottom of the structure the track can actually be used as an anchor for something like weed fabric for weed prevention, but also as a means to seal the gap from the ground to the baseboard.

FIG. 28b shows how the attachment channel could actually be located in the track to create the same seal as in FIG. 28a.

FIG. 29 shows a sample 3-position movable greenhouse rotation. A typical stationary tunnel would only be used for tomatoes. This rotation uses the building for carrots, tomatoes, spinach, and leeks.

FIG. 30 shows an example in which 6 positions 105-110 of track have been put together and two structures share those 6 locations on the same set of tracks.

FIG. 31 shows a sample movable greenhouse rotation in which 4 plots are used. In non moving structures crops are often limited to the single long season warm crop.

The anchoring system, in addition to securing the structure 101, also provides significant additional bracing and structural support for the structure 101. The anchoring secures each hoop 112 on the structure, bracing of the structure, the roller 129, or roller axle 130, bracing the structure from forces directed in multiple directions, and enhances its ability to counter adverse weather incidents. This integrated moving and anchoring system increases flexibility, saves time and money, therefore increasing the economic viability of small-scale agriculture.

Crops 103 and animals are moved and rotated through fields using movable buildings 101. The movable buildings 101 add increased flexibility, increased ability to grow crops 103 and/or raise animals in both conventional agriculture systems as well as in natural, organic, and sustainable systems.

Movable buildings 101 for agriculture include, but are not limited to, movable greenhouses for season extension and environmental control of perennial and annual crops, movable hoop coops for grazing or over-wintering animals, movable structures for holding compost and allowing the continuation of the composting process by moving the structure with piles as they are turned, movable sod houses for growing and maintaining grass outside of the conventional outdoor growing season, movable buildings for aqua-agriculture, such as moving over fish ponds or hatchery to maintain water temperature and add thermal mass to the system, and also movable buildings for shading or shelter for use with providing shade for mushroom cultivation, animals in the heat or even to warm a patio, vegetable/animal washing or processing area, or even a swimming pool.

Movable greenhouses 101 help growers by mitigating the problems associated with stationary greenhouses, relating to soil, pests, and crop rotations and timing. Movable greenhouse technology is a crucial component of maximizing the economic viability of diversified farms while also improving farm efficiency, increasing food security, and simply providing more delicious locally grown food through the year.

Advantages of Movable Greenhouses Include:

Building Organic Matter: In soil building years, movable greenhouses allow planting long-term, deep-rooting, leguminous green manure crops on the exposed sections.

Minimize Pest & Soil Concerns: Avoid the increased pest pressure while also minimizing excess soil nutrients and soil borne disease issues that are often problems for stationary greenhouses.

Season Extension: Plant cold hardy crops in the spring and fall/winter while still taking advantage of full season warm crop production.

Reduce Soil Borne Disease: Movable greenhouses instantly control soil problems by exposing the soil to the purifying effects of sun, rain, wind, snow, and freezing temperatures.

Eliminate Greenhouse Cooling: Eliminate the expense of cooling the greenhouse when planning for fall/winter harvestable crops. While summer crops are in the greenhouse growers can sow outdoors in the field where the greenhouse will move.

Diversify Crop Rotations: Movable greenhouses provide the opportunity to diversify crop rotations while at the same time incorporating long-term green manures without sacrificing greenhouse cropping potential.

Extend Market Availability: Many of the crops are harvestable up to five weeks earlier and/or five weeks later than crops without greenhouse protection, thus extending the length of the marketable season by as much as 2½ months.

Advantages of Movable Agriculture Buildings for Animals:

Grazing and Fertilizing: Grass-fed animals are pastured in movable buildings while fertilizing fields.

Full-time or Part-time Containment: Animals can be fully contained and moved with the structure or allowed to graze outside of the building Security: Having the animals inside of the structure increases security against aerial & ground predators Overwintering: These structures have the ability to be used the field during growing months and then moved to a location for overwintering animals in a protected environment the remainder of the year.

Mitigate Hot and Cold Temperatures: during extreme temperatures, movable buildings can be used to make ground available that would otherwise not be available. Example: Heat generated from chickens in a movable hoop coop in winter can be enough to keep ground thawed. In addition, with water and moisture created by animals, dry ground can be kept moist enough for agricultural purposes even in drought.

Additional Advantages of Movable Agriculture Buildings:

Low Initial Investment: When used properly, movable buildings can have a faster return on investment than stationary buildings and still have a low initial investment.

Flexible Purposes: A movable agriculture building can have several uses throughout the year. It could be used for sheep in the early spring to bring them outdoors earlier than they could if they were just outdoors. When the sheep can go outdoors without a protected structure, the building could then be used for vegetables. A building could also be used for recreation part of the year and vegetables the rest. For example, it could cover a swimming pool in the spring and fall and vegetables the rest of the year.

Equipment Moves with the Structure: Overhead irrigation, renewable energy systems (solar thermal, photovoltaic panels, or wind generators), roosts, feeders, and waterers, can all be installed to move with the structure.

Easy to Expand the Length of a Movable Building: Significant expense is occurred in materials associated with endwalls. To increase the size of a movable buildings can "stretch" by separating the building in the middle and adding 12' modules to increase the length in the middle without having to rebuild the endwalls. Example: Stretching a 48' L movable high tunnel to a 96' L high tunnel would consist of splitting the structure in the middle and adding four 12' modules to make up the new length.

Flexibility during Construction: Because the building is movable, the building site does not have to be the same as the first use site. For example, a plot can be planted in position 1 and the building can be constructed in position 2. Upon completion, the building can be moved to position 1, without disturbing the crops that are already in the ground.

The terms "Greenhouse", "High Tunnel", and "Hoop House" are used interchangeably in this document, diagrams, and attachments. The terms "Movable Agriculture Buildings for Animals" and "Hoop Coops" are used interchangeably in this document, diagrams, and attachments. None of the diagrams, drawings, or figures are to scale.

The anchoring system provides additional bracing and structural support for the structure. This integrated moving and anchoring system increases flexibility, saves time and money, therefore increasing the economic viability of small-scale agriculture.

FIG. 4 shows the cross-section of one type of track 122 and roller 129 that can serve this function. The term V-track refers to the V-grove in the roller 129 and the upside-down V-profile of the track 122. This track is formed with a break, although it could also be welded or extruded. The track and roller profile do not need to be a V-shape. A round track 122 with flanges, pegs, or feet can be secured to the ground 119 and a pipe roller 129 could be used. The track 122 could be a channel, square, curved, triangular, etc. with a compatible roller. The roller 129 can spin about its axis or can slide or glide along a track 122 or railing. Multiple rollers 129 can be used as shown in FIGS. 17a and 17b. The track itself can have wheels, casters or rollers and the structure can move along those rollers as shown in FIG. 12. The track 122 can be a rail and the structure can have a rail that slide with respect to each other. The friction between sliding members can be used to help anchor the structure and keep it from moving.

There are many ways that the track 122 can be anchored to the ground 119. It can be staked in place or set in concrete or a foundation 120. The track or rail 122 can be anchored by earth augers 135. The track or rail 122 can be bolted to concrete, rock, or a footer 120. The track or rail 122 can also be secured or anchored to an object that is already anchored. Rings or flanges could be welded or fabricated into a track or rail 122 to allow for anchoring. For example, a welded ring could be welded to a track so that a t-post can be driven through the ring, anchoring the track. There are various methods for securing the track to the ground.

FIGS. 23, 24, 25, 26a, 26b, and 26c show strategies for anchoring the structure 101 to the track 122. In these scenarios, the anchoring strategy maximizes the number of the structure's hoops 112 that are secured to the track 122. Structures 101 with odd numbers of hoops 112 can easily be anchored to all but one hoop 112 on each side. This hoop 112 could also be anchored down using two exterior anchor points 125 using earth augers 135 as shown in FIG. 26c. Structures 101 with an even number hoops 112 will have each hoop 112 secured to an anchor point 125 on the track 122. This design aligns the anchor points 125 with the center of the hoop spacing. This ensures that each track anchor point 125 is located in between two hoops 112 in order to anchor as many hoops 112 to the track 122 as possible.

The anchor points 125 do not need to be centered in the hoops 112. An anchor point could be centered below hoop #2 114 and secured to hoop #2 114. Or the anchor point below hoop #2 114 could be secured to hoop #1 113 and hoop #3 115 (and potentially hoop #2 114 as well). Table 1 (shown below) is a reference chart showing one design, this is also shown in FIG. 20. In this embodiment, the anchor points 125 are installed in the beginning for each location of the structure 101. The anchor points 125 are always in between two hoops 112. The track length is twice the hoop spacing and starts half of the hoop spacing before the structure 101. In this example the hoop spacing is 6 ft and the track extends past each end by 3 ft. This ensures that the same track pieces can be used on both sides (right and left track sections are the same). The track seams may end up at an anchor point 125, than the forged anchor eye 142 on the track 112 replaces one of the tract connector bolts. For the 3-position 30 ft×48 ft structure, this will not occur at the first or second anchor point 125 (6 ft and 18 ft from the end respectively), but will occur for the third anchor point 125 at 36 ft. FIG. 20 shows the anchor point locations with respect to the track 122 and the structure 101.

TABLE 1

V-TRACK MOVABLE HIGH TUNNEL REFERENCE CHART

The following charts contains important information regarding FST 2nd Generation V-Track. Each column specifies the high tunnel length and number of positions.

| 24′ High Tunnel length | | 48′ High Tunnel Length | | 96′ High Tunnel Length | |
|---|---|---|---|---|---|
| 24 ft | 24 ft | 48 ft | 48 ft | 96 ft | 96 ft |
| Total # of Positions | | Total # of Positions | | Total # of Positions | |
| 2 Positions | 3 Positions | 4 Positions | 2 Positions | 3 Positions | 4 Positions |
| Total # of Hoops (6′ Spacing) | | Total # of Hoops (6′ Spacing) | | Total # of Hoops (6′ Spacing) | |
| 5 Hoops | 5 Hoops | 9 Hoops | 9 Hoops | 17 Hoops | 17 Hoops |
| Total # of Anchor Eyes | | Total # of Anchor Eyes | | Total # of Anchor Eyes | |
| 8 Anchor Eyes | 12 Anchor Eyes | 16 Anchor Eyes | 24 Anchor Eyes | 32 Anchor Eyes | 48 Anchor Eyes | 64 Anchor Eyes |
| | Anchor Eyes located between: Hoops 1&2, and Hoops 4&5. | Anchor Eyes located between: Hoops 1&2, Hoops 3&4, and Hoops 8&9. | | Anchor Eyes located between: Hoops 1&2, Hoops 3&4, Hoops 5&6, Hoops 7&8, Hoops 10&11, Hoops 12&13, Hoops 14&15, Hoops 16&17. | |
| Total Track Length | | Total Track Length | | Total Track Length | |
| 60 ft | 90 ft | 120 ft | 108 ft | 162 ft | 216 ft | 204 ft | 306 ft | 408 ft |
| 3 ft Overlap | 3 ft Overlap | 3 ft Overlap | 3 ft Overlap | 3 ft Overlap | 3 ft Overlap | 3 ft Overlap | 3 ft Overlap | 3 ft Overlap |
| 24 ft Position 1 | 24 ft Position 1 | 24 ft Position 1 | 48 ft Position 1 | 48 ft Position 1 | 48 ft Position 1 | 96 ft Position 1 | 96 ft position 1 | 96 ft Position 1 |
| 6 ft Gap | 6 ft Gap | 6 ft Gaps | 6 ft Gap | 6 ft Gap | 6 ft Gap | 6 ft Gap | 6 ft Gap |
| 24 ft Position 2 | 24 ft Position 2 | 24 ft Position 2 | 48 ft Position 2 | 48 ft Position 2 | 48 ft Position 2 | 96 ft Position 2 | 96 ft Position 2 |
| 3 ft Overlap | 6 ft Gap | 3 ft Overlap | 6 ft Gap | 3 ft Overlap | 6 ft Gap | 3 ft Overlap |
| | 24 ft Position 3 | | 48 ft Position 3 | | 96 ft Position 3 |
| | 3 ft Overlap | | 6 ft Gap | | 3 ft Overlap |
| | | 24 ft Position 4 | | 48 ft Position 4 | | 96 ft Position 4 |
| | | 3 ft Overlap | | 3 ft Overlap | | 3 ft Overlap |
| Total # of 12′ V-Track Sections | | Total # of 12′ V-Track Sections | | Total # of 12′ V-Track Sections | |
| 10 Sections | 15 Sections | 20 Sections | 18 Sections | 27 Sections | 36 Sections | 34 Sections | 51 Sections | 68 Sections |
| Total # of 1′ V-Track Connectors | | Total # of 1′ V-Track Connectors | | Total # of 1′ V-Track Connectors | |
| 8 Connectors | 14 Connectors | 18 Connectors | 16 Connectors | 26 Connectors | 34 Connectors | 32 Connectors | 50 Connectors | 66 Connectors |
| Distance (ft) from End of Track to Each Anchor Eye | | Distance (ft) from End of Track to Each Anchor Eye | | Distance (ft) from End of Track to Each Anchor Eye | |
| 6 Anchor: 1 Pos: 1 | 6 Anchor: 1 Pos: 1 | 6 Anchor: 1 Pos: 1 | 6 Anchor: 1 Pos: 1 | 6 Anchor: 1 Pos: 1 | 6 Anchor: 1 Pos: 1 | 6 Anchor: 1 Pos: 1 | 6 Anchor: 1 Pos: 1 | 6 Anchor: 1 Pos: 1 |
| 24 Anchor: 2 Pos: 1 | 24 Anchor: 2 Pos: 1 | 24 Anchor: 2 Pos: 1 | 18 Anchor: 2 Pos: 1 | 18 Anchor: 2 Pos: 1 | 18 Anchor: 2 Pos: 1 | 18 Anchor: 2 Pos: 1 | 18 Anchor: 2 Pos: 1 |
| 36 Anchor: 1 Pos: 2 | 36 Anchor: 1 Pos: 2 | 36 Anchor: 1 Pos: 2 | 36 Anchor: 3 Pos: 1 | 36 Anchor: 3 Pos: 1 | 36 Anchor: 3 Pos: 1 | 30 Anchor: 3 Pos: 1 | 30 Anchor: 3 Pos: 1 |
| 54 Anchor: 2 Pos: 2 | 54 Anchor: 2 Pos: 2 | 54 Anchor: 2 Pos: 2 | 48 Anchor: 4 Pos: 1 | 48 Anchor: 4 Pos: 1 | 48 Anchor: 4 Pos: 1 | 42 Anchor: 4 Pos: 1 | 42 Anchor: 4 Pos: 1 |
| | 66 Anchor: 1 Pos: 3 | 66 Anchor: 1 Pos: 3 | 60 Anchor: 1 Pos: 2 | 60 Anchor: 1 Pos: 2 | 60 Anchor: 5 Pos: 1 | 60 Anchor: 5 Pos: 1 |
| | 84 Anchor: 2 Pos: 3 | 84 Anchor: 2 Pos: 3 | 72 Anchor: 2 Pos: 2 | 72 Anchor: 2 Pos: 2 | 72 Anchor: 6 Pos: 1 | 72 Anchor: 6 Pos: 1 |
| | | 96 Anchor: 1 Pos: 4 | 90 Anchor: 3 Pos: 2 | 90 Anchor: 3 Pos: 2 | 84 Anchor: 7 Pos: 1 | 84 Anchor: 7 Pos: 1 |
| | | 114 Anchor: 2 Pos: 4 | 102 Anchor: 4 Pos: 2 | 102 Anchor: 4 Pos: 2 | 96 Anchor: 8 Pos: 1 | 96 Anchor: 8 Pos: 1 |
| | | | | 114 Anchor: 1 Pos: 3 | 108 Anchor: 1 Pos: 2 | 108 Anchor: 1 Pos: 2 |
| | | | | 126 Anchor: 2 Pos: 3 | 120 Anchor: 2 Pos: 2 | 120 Anchor: 2 Pos: 2 |
| | | | | 144 Anchor: 3 Pos: 3 | 132 Anchor: 3 Pos: 2 | 132 Anchor: 3 Pos: 2 |
| | | | | 156 Anchor: 4 Pos: 3 | 144 Anchor: 4 Pos: 2 | 144 Anchor: 4 Pos: 2 |
| | | | | 168 Anchor: 1 Pos: 4 | 162 Anchor: 5 Pos: 2 | 162 Anchor: 5 Pos: 2 |
| | | | | 180 Anchor: 2 Pos: 4 | 174 Anchor: 6 Pos: 2 | 174 Anchor: 6 Pos: 2 |
| | | | | 198 Anchor: 3 Pos: 4 | 186 Anchor: 7 Pos: 2 | 186 Anchor: 7 Pos: 2 |
| | | | | 210 Anchor: 4 Pos: 4 | 198 Anchor: 8 Pos: 2 | 198 Anchor: 8 Pos: 2 |
| | | | | | | 210 Anchor: 1 Pos: 3 |
| | | | | | | 222 Anchor: 2 Pos: 3 |
| | | | | | | 234 Anchor: 3 Pos: 3 |
| | | | | | | 246 Anchor: 4 Pos: 3 |

TABLE 1-continued

V-TRACK MOVABLE HIGH TUNNEL REFERENCE CHART
The following charts contains important information regarding FST 2nd Generation V-Track.
Each column specifies the high tunnel length and number of positions.

| | |
|---|---|
| 258 Anchor: 5 Pos: 3 | 258 Anchor: 5 Pos: 3 |
| 276 Anchor: 6 Pos: 3 | 276 Anchor: 6 Pos: 3 |
| 288 Anchor: 7 Pos: 3 | 288 Anchor: 7 Pos: 3 |
| 300 Anchor: 8 Pos: 3 | 300 Anchor: 8 Pos: 3 |
| | 312 Anchor: 1 Pos: 4 |
| | 324 Anchor: 2 Pos: 4 |
| | 336 Anchor: 3 Pos: 4 |
| | 348 Anchor: 4 Pos: 4 |
| | 360 Anchor: 5 Pos: 4 |
| | 378 Anchor: 6 Pos: 4 |
| | 390 Anchor: 7 Pos: 4 |
| | 402 Anchor: 8 Pos: 4 |

The design highlighted in FIG. 9, FIG. 10, FIG. 11, FIG. 21a, FIG. 21b, FIG. 23, FIG. 24, FIG. 25 has the structure anchored to the track anchor point 125 with steel cable or wire 151. FIGS. 23, 23, and 25 show the cables 151 secured to the hoops 112 of the structure 101 approximately 3 ft from the ground 119 and attaches to a forged eye-bolt 141 going through the hoop 112 of the structure 101.

In this iteration, the cable is secured to the forged eye-bolts 141 that pass through the hoops 112 with a wire thimble 154 and wire clamps 155. The hoops 112 at the endwalls 113 do not use a forged eye-bolt 141 so that the threads do not extend past the endwall. Although a forged eye-bolt 141 could be used, a brace band 146 is substituted as shown in FIG. 23. Brace bands 146 could be used everywhere where the cable anchoring secures to the structure. Other hardware can also be used, for example double-brace bands, shackles 161, etc.

The cable 151 is secured to the track anchor eye 142 with a quick link 160, a turn-buckle 158, a wire thimble 154, and wire clamps 155. A compression sleeve could easily be substituted wherever the wire thimble 154 and clamp 155 are used. The quick link 160 is easy to install and can easily be removed when the structure is unanchored and moved. The turn-buckle 158 tightens the anchoring cable 151 and can be loosened when the quick link 160 needs to be removed. This assembly is shown in FIG. 27a and FIG. 27f. Other flexible items can be used instead of wire/cable 151, chain for example. Rigid members or bars can also be used. These items can be tensioned with threads, turn-buckles 158, chain binders, draw latches, cumalong, tension clips, webbing, knots or clasps. The cable 151 (or cable substitute) can anchor to one or multiple points 125 on the structure 101. The anchoring could be at or between the hoops of a structure as shown in FIG. 24. The structure 101 can be anchored to the bottom of the hoops 112, higher up the hoops 112, or to any of the structure's other bracing or components. The rollers 129 or axles 130 themselves can be anchored to the track 122, rail, or ground 119. For example, the roller axle 130 could be a forged eye-bolt 141 and the eye could be anchored to the track 122, rail or ground 119 as shown in FIG. 11. FIG. 17a and FIG. 17b shows an alternative roller concept where a second roller 129 is used to secure the structure to the track 122. In this case the track 122 or rail fits in between the rollers 129. The structure 101 is secured to the rail 122 with two rollers 129. A bolt, pin, or other device can be used to prohibit the structure 101 or rollers 129 from moving.

The roller 129 could fit inside of the track prohibiting the tunnel in one direction (ex: up/down) but still need to be anchored in another direction (ex: front/back). A channel track 122 can be anchored and rollers 129 or sliding objects can fit inside the channel. To stop the structure from rolling bolts or pegs could be installed on either side of the roller to prohibit movement, a similar implementation to FIG. 22.

A device could rotate up from the track (or down from the structure) to secure, the two elements together, FIG. 22. The structure could be held in place with magnetic forces. For example, electro-magnets or physical magnets could be used to keep the structure anchored in place. Magnetic force can be used to move the structure 101 along a track 122 or rail (similar to trains on magnetic rails). The track 122 could be fabricated so that pins or through bolts can be installed to lock the track 122 and structure together.

The track 122 is designed for multiple track 122 pieces to seam together. This ties the track 122 and anchoring together. An alternative design could have track sections 123 that are not seamed together with track connectors 124. Instead each track 122 section could be secured by itself. One example of this could be a concrete footer 120 installed below each track seam. The end of each track 122 could then secure to one side of the footer. This would allow for uninterrupted motion of the roller 129 over the track 122, without actually seaming the track sections 123 together. FIG. 18 and FIG. 19 show one design for seaming track sections 123 together. Again, the track connector bolts can be replaced for forged anchor eyes 142 for an anchor point 125 at that location. The holes for the track connector bolts are slotted so that a carriage bolt can be used, eliminating the need for two wrenches/sockets during installation.

Track sections 123 can move with the structure 101. The structure 101 could be anchored to one track position. When moved, a second track position (full or partial) could be installed so that structure 101 can move. The old track 122 that is no longer can be moved (or leap frogged) ahead so the structure 101 can be moved further. Using this method one track section (or one full position of track) can be repeatedly moved and the structure can transpose indefinitely along its length.

FIG. 18 is a top view of the V-track and its various holes and their purpose. The four holes on each end are for the track connector bolts or a forged anchor eye 142 if an anchor point 125 lands on a track seam. The hole in the center is for an anchor point 125 if needed. The four larger holes are for the track anchors 136. These anchor holes are large enough to install the track anchors 136 at an angle. The V-track connectors 124 have eight holes that line up with the track connector holes. All of the track connecting holes are slotted for ease of assembly. The slots on the track run a perpendicular direction to the slots on the connectors. This gives the user some play when installing the track.

Supplemental anchors may be used or required when the tunnel is left in place or during severe weather. Earth augers 135 are shown in FIG. 26a, FIG. 26b, and FIG. 26c for that purpose. These anchors can help secure the track 122 and/or structure 101. Anchor points 125 can be on the inside and outside of the center of the track. In some applications you might want it on the inside on one side and the outside on the other. This may be relevant in situations where a predominant wind comes from the same direction.

What is claimed is:

1. A movable agriculture building and track system comprising:
    a track that is securely anchored to a plot of farming land using one or more securing members, the track comprising at least one rail wherein a portion of the plot is disposed proximate to the at least one rail;
    a movable agriculture building that is configured to be anchored and de-anchored directly to the track, the movable agriculture building comprising:
        a housing defining an interior area, the housing comprising one or more structural support members; and
        a moving member for facilitating movement of the housing along the track; and
    an anchoring member that removably anchors the building housing directly to the track;
    wherein the interior area of the building covers the plot of farming land such that items within the interior area are exposed to conditions created by the building.

2. The movable agriculture building and track system of claim 1, wherein the anchoring member that anchors the building to the track is configured to secure the building to the ground because the track is secured to the ground using the one or more securing members, thereby providing bracing of and structural integrity to the movable agriculture building.

3. The movable agriculture building and track system of claim 1, wherein the track comprises a securing device, the building being secured to the track via the track's securing device.

4. A method for farming comprising:
  anchoring a track to a first area of a first plot of farming land using at least one securing member;
  anchoring a movable agriculture building directly to the track so that the movable agriculture building is disposed over the first plot of farming land and so that the track secures the movable agriculture building to the first plot of farming land, the movable agriculture building comprising:
    a housing defining an interior area, the housing comprising one or more structural support members; and
    a moving member for facilitating movement of the movable agriculture building along the track;
  de-anchoring the movable agriculture building from the track and moving the movable agriculture building along the track using the moving member; and
  anchoring the movable agriculture building directly to the track so that the greenhouse is disposed over a second area of the first plot of farming land.

5. The method of farming of claim 4, wherein an anchoring member that secures the building to the track is configured to secure the building to the ground because the track is secured to the ground using the one or more securing members, thereby providing bracing of and structural integrity to the movable agriculture building.

6. The method of farming of claim 4, wherein the track comprises a securing device, the building being secured to the track via the track's securing device.

* * * * *